US012001382B2

(12) United States Patent
Lee et al.

(10) Patent No.: US 12,001,382 B2
(45) Date of Patent: Jun. 4, 2024

(54) METHODS, APPARATUS, AND ARTICLES OF MANUFACTURE TO GENERATE COMMAND LISTS TO BE OFFLOADED TO ACCELERATOR CIRCUITRY

(71) Applicant: Intel Corporation, Santa Clara, CA (US)

(72) Inventors: Celine Lee, Sunnyvale, CA (US); Niranjan Hasabnis, Fremont, CA (US); Paul Petersen, Austin, TX (US); Justin Gottschlich, Santa Clara, CA (US); Ramesh Peri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 17/559,556

(22) Filed: Dec. 22, 2021

(65) Prior Publication Data

US 2022/0114137 A1   Apr. 14, 2022

(51) Int. Cl.
*G06F 15/80* (2006.01)
*G06F 3/06* (2006.01)
(Continued)

(52) U.S. Cl.
CPC .......... *G06F 15/80* (2013.01); *G06F 13/4068* (2013.01); *G06N 20/00* (2019.01)

(58) Field of Classification Search
CPC .......... G06F 3/084; G06N 5/01; G06N 3/045; G06N 20/00; G06N 3/006; G06F 9/4881;
(Continued)

(56) References Cited

U.S. PATENT DOCUMENTS 9,563,537 B1\* 2/2017 Barsness ............. G06F 11/3624
2015/0081879 A1\* 3/2015 Branson .................. H04L 45/24
709/224
(Continued)

OTHER PUBLICATIONS

Andrade et al., "A Review on Software Architectures for Heterogeneous Platforms," arXiv:1905.01695v1 [cs.SE], [https://doi.org/10.48550/arXiv.1905.01695], May 5, 2019, 10 pages.
(Continued)

*Primary Examiner* — Chun Kuan Lee
(74) *Attorney, Agent, or Firm* — HANLEY, FLIGHT & ZIMMERMAN, LLC

(57) ABSTRACT

Methods, apparatus, systems, and articles of manufacture are disclosed to generate command lists to be offloaded to accelerator circuitry. An example apparatus includes kernel duration model circuitry to predict a duration of execution of a first kernel based on a first source location, a first name, a first property of a first argument, or an occupancy of the first kernel. The example apparatus includes subsequent kernel model circuitry to predict a tuple and a dependency of a second kernel based on a second source location, a second name, a second property of a second argument, or a time of submission of the previous kernel. The example apparatus includes reinforcement learning model circuitry to determine whether to bundle the first kernel into a command list based on the duration of execution of the first kernel, the tuple of the second kernel, or the dependency of the second kernel.

25 Claims, 15 Drawing Sheets

(51) Int. Cl.
*G06F 9/455* (2018.01)
*G06F 9/48* (2006.01)
*G06F 9/50* (2006.01)
*G06F 13/40* (2006.01)
*G06N 3/006* (2023.01)
*G06N 3/045* (2023.01)
*G06N 3/08* (2023.01)
*G06N 3/084* (2023.01)
*G06N 5/01* (2023.01)
*G06N 20/00* (2019.01)

(58) Field of Classification Search
CPC ... G06F 13/4068; G06F 15/80; G06F 15/7867
USPC .......................................................... 712/15
See application file for complete search history.

(56) References Cited

U.S. PATENT DOCUMENTS

2017/0212563 A1* 7/2017 Farazmand ........... G06F 1/3243
2018/0302800 A1* 10/2018 O'Shea .................. H04L 47/83
2019/0065271 A1* 2/2019 Purnaprajna .......... G06F 9/5044

OTHER PUBLICATIONS

Ahmed et al., "A load balance multi-scheduling model for OpenCL kernel tasks in an integrated cluster," Soft Computing (2021) 25: 407-420, Jul. 15, 2020, 14 pages.

Huchant et al., "Automatic OpenCL Task Adaptation for Heterogeneous Architectures," Proceedings of the 22nd International Conference on Euro-Par 2016: Parallel Processing, vol. 9833, Dec. 21, 2016, 12 pages.

Mirhoseini et al., "Device Placement Optimization with Reinforcement Learning," Proceedings of the 34th International Conference on Machine Learning, PMLR 70, 2017, 10 pages.

Ghose et al., "Divergence Aware Automated Partitioning of OpenCL Workloads," ISEC '16, Feb. 18, 2016, 5 pages.

"Drivers and Devices," Specification, accessed on Dec. 11, 2021, 46 pages.

Grewe et al., "A Static Task Partitioning Approach for Heterogeneous Systems Using OpenCL," International Conference on Compiler Construction, 2011, 20 pages.

Radford et al., "Improving Language Understanding by Generative Pre-Training," OpenAi, 2018, 13 pages.

Intel, "oneAPI: A New Era of Heterogeneous Computing," Intel Corporation, [https://www.intel.com/content/www/us/en/developer/tools/oneapi/overview.html#gs.ijfh2t], retrieved Dec. 11, 2021, 10 pages.

Patabandi et al., "Predictive Data Locality Optimization for Higher-Order Tensor Computations," MAPS '21, Jun. 21, 2021, 10 pages.

Luk et al., "Qilin: Exploiting Parallelism on Heterogeneous Multiprocessors with Adaptive Mapping," MICRO '09, Dec. 12, 2009, 11 pages.

Khronos Group, "SYCL Overview," The Khronos Group Inc., [https://www.khronos.org/api/index_2017/sycl], retrieved Dec. 11, 2021, 11 pages.

Gottschlich et al., "The Three Pillars of Machine Programming," arXiv:1803.07244v3 [cs.AI], [https://doi.org/10.48550/arXiv.1803.07244], Jun. 26, 2021, 11 pages.

* cited by examiner

METHODS, APPARATUS, AND ARTICLES OF MANUFACTURE TO GENERATE COMMAND LISTS TO BE OFFLOADED TO ACCELERATOR CIRCUITRY

FIELD OF THE DISCLOSURE

This disclosure relates generally to machine learning and, more particularly, to methods, apparatus, and articles of manufacture to generate command lists to be offloaded to accelerator circuitry.

BACKGROUND

Computer hardware manufacturers develop hardware components for use in various components of a computer platform. For example, computer hardware manufacturers develop motherboards, chipsets for motherboards, central processor units (CPUs), hard disk drives (HDDs), solid state drives (SSDs), and other computer components. Additionally, computer hardware manufacturers develop processor circuitry, known as accelerators, to accelerate the processing of a workload. For example, an accelerator can be a CPU, a graphics processor unit (GPU), a vision processor unit (VPU), and/or a field programmable gate array (FPGA).

Many computer hardware manufacturers develop programs and/or other techniques to assign or offload a portion of a compute workload to a specific processing platform. Such programs and/or other techniques can be carried out by using machine-learning models. Machine-learning models, such as neural networks, are useful tools that have demonstrated their value solving complex problems regarding pattern recognition, natural language processing, automatic speech recognition, etc.

Figure 1:
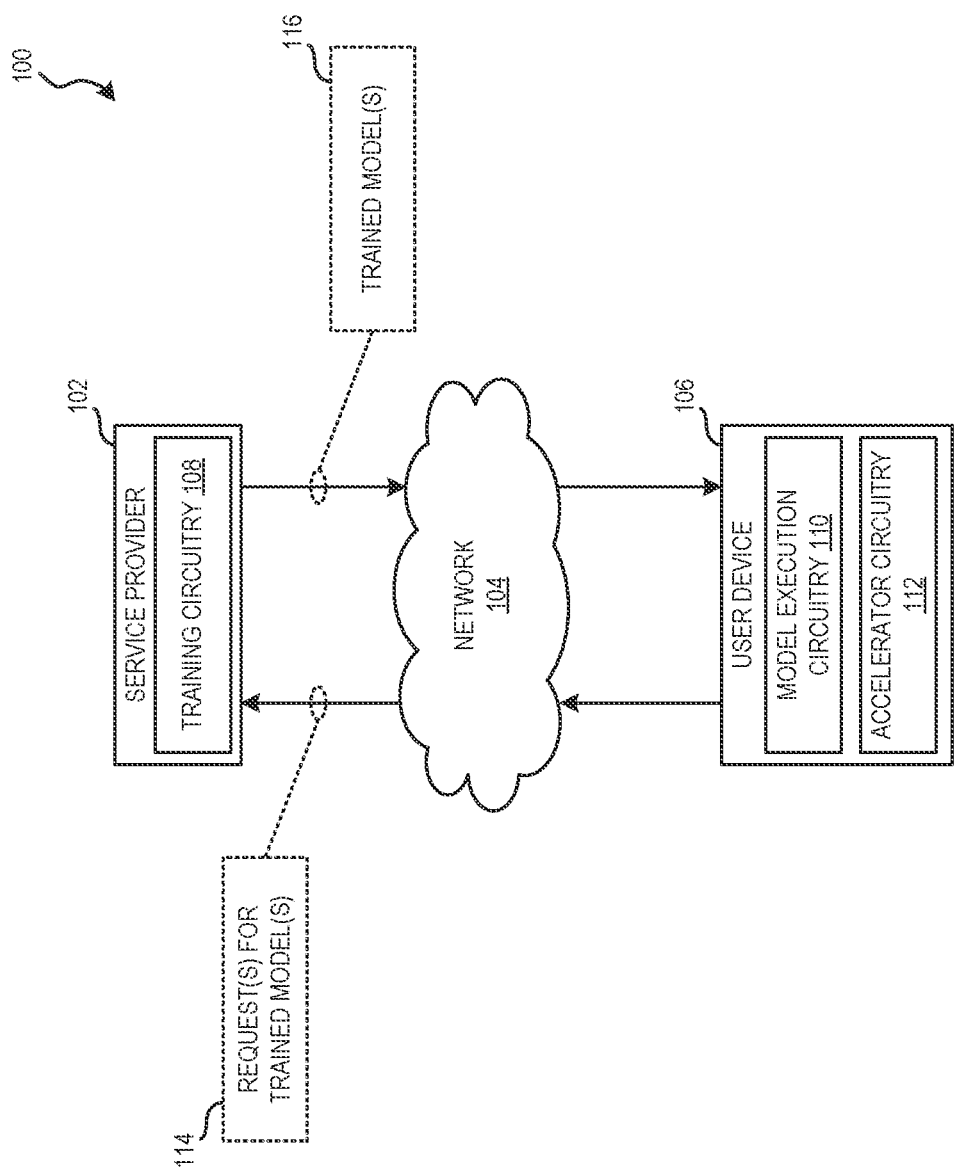
FIG. 1 is an environment including an example service provider, an example network, and an example user device in accordance with teachings of this disclosure.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and its variants refers to values that may not be exact due to complexity involved in modeling the values. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s). In some examples, ASIC refers to Application Specific Integrated Circuitry.

DETAILED DESCRIPTION

Many computer hardware manufacturers develop processor circuitry, known as accelerators, to accelerate the processing of a workload. Accelerators, while capable of processing any type of workload, are designed to optimize particular types of workloads. For example, while CPUs and FPGAs can be designed to handle more general processing, GPUs can be designed to improve the processing of video, games, and/or other physics and mathematically based calculations. Additionally, VPUs can be designed to improve the processing of machine vision tasks.

Some accelerators are designed to improve the processing of artificial intelligence (AI) applications. While a VPU is a specific type of AI accelerator, many different AI accelerators can be used. In fact, many AI accelerators can be implemented by application specific integrated circuits (ASICs). Such ASIC-based AI accelerators can be designed to improve the processing of tasks related to a particular type of AI, such as machine learning (ML), deep learning (DL), and/or other AI-based machine-driven logic including support vector machines (SVMs), neural networks (NNs), recurrent neural networks (RNNs), convolutional neural networks (CNNs), long short-term memory (LSTM), gate recurrent units (GRUs), reinforcement learning (RL). etc.

Computer hardware manufactures also develop heterogeneous systems that include more than one type of processor circuitry. For example, computer hardware manufactures may combine both general purpose processor circuitry, such as CPUs, with general purpose accelerators, such as FPGAs, and/or special purpose accelerators, such as GPUs, VPUs, and/or other AI accelerators. Such heterogeneous systems can be implemented as systems on a chip (SoCs). Accelerators are referred to herein as accelerator circuitry.

The advance of technology has increased demand for heterogeneous hardware for offloading of computation in computation-intensive applications such as deep learning and graphics processing. Some companies have developed programming models to assist heterogeneous hardware. For example, Intel® oneAPI is a unified programming model that delivers a common developer experience across a variety of hardware architectures including accelerator circuitry architectures. oneAPI is built with the Data Parallel C++ (DPC++) language and incorporates SYCL as a cross-platform programming language. SYCL is a domain-specific embedded language that allows for abstraction when programming for heterogenous hardware. oneAPI allows developers to take advantage of parallelization opportunities in a heterogeneous hardware system by offloading compute kernels to the various compute platforms including CPUs, GPUs, FPGAs, or the like.

A compute kernel refers to a routine that has been compiled to be executed and/or instantiated by accelerator circuitry to achieve high throughput. Compute kernels are viewed conceptually as separate from but used by a main program that is typically executed and/or instantiated by general purpose processor circuitry such as a CPU. Compute kernels are referred to herein as kernels. Automatically and efficiently offloading kernels to heterogeneous hardware is challenging task for system developers. This task also presents a challenge in the field of machine programming, which is concerned with the automation of software.

In some existing techniques, kernels are scheduled onto accelerator circuitry (e.g., GPUs) by following command lists. A command list is a sequence of commands (e.g., kernels) for execution in a command queue for accelerator circuitry (e.g., a GPU). A command queue is the channel and context to which a command list is submitted for execution and/or instantiation by accelerator circuitry. Generating and submitting a command list is a computationally expensive task.

For example, kernel offloads are described one-at-a-time using SYCL instructions and kernel offloads are packed into a command list by a runtime scheduler. Generating the command list incurs non-trivial time costs. Additionally, while the runtime scheduler is generating the command list, the accelerator circuitry (e.g., a GPU) may be idle, thereby wasting computational resources.

Also, a heterogeneous system generally must complete all work associated with a first command list before a second command list can be scheduled for offload to accelerator circuitry (e.g., a GPU). For example, this work includes generating a command list, executing and/or instantiating kernels in the command list, and destroying the command list. Example execution and/or instantiation of a kernel involves memory allocation time, time for data transfer between general purpose processor circuitry and accelerator circuitry, kernel execution time, and time for data transfer from the accelerator circuitry to the general purpose processor circuitry.

Naively designed kernel and command list scheduling may produce poor performance for heterogeneous systems. For example, if command lists are generated too frequently, the accelerator circuitry (e.g., a GPU) will have reduced utilization as the accelerator circuitry idles during the frequent periods during which command lists are generated. For example, frequently generated command lists tend to describe smaller amounts of work. When submitted to large accelerator circuitry, the total available work in the command list might not saturate the entire device. Typically, undersaturation occurs if a command list includes a single kernel. A heterogeneous system implementing single kernel command lists is continually subjected to the computational overhead utilized to create and submit a new command list for every kernel, and a single kernel may not be large enough to fill the accelerator circuitry.

Combining multiple kernels together reduces this problem. Normally the desired size for the set of kernels in a command list is when the total parallel work is a small factor (e.g., 1.1×-2×) more than needed to saturate the accelerator circuitry, and the duration of the work is two times (e.g., 2×)

or more than the cost to submit more work. A kernel is composed of a set of workgroups defining the iteration space of the kernel, each work group is assigned to a processing element on the device. To saturate the accelerator circuitry, the total number of workgroups should be a small factor bigger than the number of processing elements on the accelerator circuitry.

Conversely, if too many kernels are combined into a command list (e.g., if command lists are generated too infrequently), the accelerator circuitry may become totally idle (e.g., the accelerator circuitry may have finished the prior command list and now has nothing to do). The accelerator circuitry cannot make use of a partially constructed command list, and must wait until the command list is closed and submitted to the acceleratory circuitry.

Existing techniques to schedule kernels and command lists include sending a kernel to accelerator circuitry (e.g., a GPU) as soon as the kernel is available, and the accelerator circuitry is idle. In this manner, the accelerator circuitry is utilized at any time a kernel is ready for execution. While the kernel is running on accelerator circuitry, all subsequent kernels that arrive are collected into a command list that is scheduled after the accelerator circuitry completes processing of the current kernel.

This existing technique is likely to have poor compute utilization and runtime efficiency, particularly when the queued kernels may be small (e.g., the kernels produce low utilization of accelerator circuitry). Because command lists are run to completion before another command list can be scheduled, subsequent kernels must wait for the first kernel to complete before they can be scheduled onto the accelerator circuitry. For example, if the first kernel only occupies a small number of threads on a GPU, then the GPU utilization is low for the entire duration of the first kernel and subsequent kernels must wait until the GPU completes executing the first kernel.

Another existing technique maps OpenCL® applications to heterogeneous system by using a static analyzer to extract CPU and GPU features for an application, filter the features based on composition, and then use the features to train a multi-class machine learning model that can be used in online prediction to schedule applications to a processor. Further, existing techniques incorporate control-flow divergence as a feature in a learned classifier to automatically partition OpenCL® workloads between a single CPU and a single GPU to improve timing performance.

Additionally, one exiting technique statically extracts features from an OpenCL® program during compilation and uses a learned model to predict whether to map a kernel to a CPU, GPU, or to partition the kernel workload among available computing devices. Adaptive mapping is an existing technique to automatically map computations to processors in heterogeneous systems. One implementation of the adaptive mapping technique includes a heterogeneous programming system that provides users with a set of application programming interface (API) calls to write parallelizable programs. This implementation of the adaptive mapping technique then dynamically compiles the programs into machine code and adaptively maps computations to processing elements, using data obtained from previous program runs to project execution times of previously unseen inputs.

Another existing technique automatically splits computation and data for a single kernel across computing devices at appropriate granularities for load balancing. This adaptive work group partitioning is done without any training. Instead, a kernel is statically analyzed and transformed into a parametric partition-ready kernel then a dynamic fixed-point iteration is used to try to converge on an optimal partitioning of the kernel across machines. Further existing techniques include using a reinforcement learning-based device placement model to optimize communication between subsets of operations in a TensorFlow® computational graph placed onto multiple devices. Such techniques seek to address device placement for neural network training and inference.

Existing techniques are either concerned with mapping single kernels to different hardware or partitioning a single kernel across different hardware. However, existing techniques do not address a larger issue of clustering independent in-order kernels into command lists for scheduling tasks onto accelerator circuitry. As such, existing techniques do not consider minimizing the non-trivial cost of generating and submitting command lists as well as maximizing compute utilization of accelerator circuitry. Accordingly, such existing technique result in underutilization of accelerator circuitry which degrades efficiency of heterogeneous processor circuitry.

Examples disclosed herein predict future kernels when determining whether to schedule a current kernel into a command list for improved accelerator circuitry (e.g., GPU) utilization and reduced total runtime in heterogeneous systems. Accordingly, examples disclosed herein operate on a scheduling granularity different than exiting techniques. As such, examples disclosed herein reduce the cost (e.g., a large cost) associated with the existing techniques that create command lists. Further, examples disclosed herein improve underutilization of heterogeneous hardware compute resources. Accordingly, examples disclosed herein reduce runtime in comparison to existing techniques and improve performance of end-to-end applications executing on heterogeneous systems.

FIG. 1 is an example environment 100 including an example service provider 102, an example network 104, and an example user device 106 in accordance with teachings of this disclosure. In the example of FIG. 1, the service provider 102 includes example training circuitry 108. In the example of FIG. 1, the user device 106 includes example model execution circuitry 110 and example accelerator circuitry 112. In the example of FIG. 1, the example service provider 102, the example user device 106, and/or one or more additional devices are communicatively coupled via the example network 104.

In the illustrated example of FIG. 1, the service provider 102 is implemented by processor circuitry. For example, the service provider 102 may be implemented by one or more servers executing and/or instantiating instructions to train one or more AI-based models (e.g., NNs, transformer models, RL models, etc.) and/or one or more peripheral components to the one or more AI-based models. As described above, AI, including ML, DL, and/or other AI-based machine-driven logic, enables machines (e.g., computers, logic circuits, etc.) to use a model or models to process input data to generate an output based on patterns and/or associations previously learned by the model(s) via a training process. For example, the model(s) may be trained with data to recognize patterns and/or associations and follow such patterns and/or associations when processing input data such that other input(s) result in output(s) consistent with the recognized patterns and/or associations.

In the illustrated example of FIG. 1, the service provider 102 offers one or more services and/or products to end-users. For example, the service provider 102 provides one or more trained models for download, hosts a web-interface through which a user may access the one or more models, etc. In examples disclosed herein, the service provider 102 offers one or more NN models, one or more transformers models, and one or more RL models. However, other types of machine learning models and/or machine learning architectures may be used. In the example of FIG. 1, an NN model implements a kernel duration model and a transformer model implements a subsequent kernel model. As such, the one or more models provided by the service provider 102 include one or more kernel duration models, one or more subsequent kernel models, and/or one or more RL models.

Using a NN model to implement the kernel duration model provides benefits to the model execution circuitry 110 with respect to feature selection. In general, machine learning models/architectures that are suitable to use when implementing the kernel duration model will be deep neural networks (DNNs). However, other types of machine learning models could additionally or alternatively be used such as random forest trees, support vector machines, etc.

Using a transformer model to implement the subsequent kernel model provides benefits to the model execution circuitry 110 as it is a reputable model for sequence data. In general, machine learning models/architectures that are suitable to use when implementing the subsequent kernel model will be sequential models. However, other types of machine learning models could additionally or alternatively be used such as long short-term memory (LSTM) models, recurrent neural networks (RNNs), temporal convolution networks (TCNs), among others.

Using an RL model enables the model execution circuitry 110 to implement a learning algorithm for the kernel duration model and the subsequent kernel model during deployment. In general, machine learning models/architectures that are suitable to use (other than an RL model) in the example approaches disclosed herein will be lightweight (e.g., computationally non-intensive), thereby allowing the model execution circuitry 110 to reduce added computational burden while implementing a learning algorithm for the kernel duration model and the subsequent kernel model during deployment. However, other types of machine learning models could additionally or alternatively be used such as Q-learning, among others.

In some examples, the service provider 102 provides end-users with a plugin that implements the one or more models. In this manner, the end-user can implement the one or more models locally (e.g., at the user device 106). In some examples, an end-user can implement the one or more models as a plugin to an integrated development environment (IDE) installed on the user device 106. In some examples, instructions to implement the one or more models may be included in an IDE. In such examples, when an end-user purchases, leases, or otherwise obtains and/or accesses the IDE from a developer of the IDE, the end-user also obtains and/or accesses the instructions to implement the one or more models.

In the illustrated example of FIG. 1, the network 104 is the Internet. However, the example network 104 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 104 is an enterprise network (e.g., within businesses, corporations, etc.), a home network, among others. The example network 104 enables the service provider 102 (including the training circuitry 108) and the user device 106 (including the model execution circuitry 110 and the accelerator circuitry 112) to communicate. For example, the user device 106 may transmit one or more requests 114 for one or more trained models 116. In such an example, the service provider 102 responds to the one or more requests 114 with the one or more trained models 116 including instructions to implement an RL model and/or one or more peripheral components to the models, as further described below.

In general, implementing a ML/AI system involves two phases, a learning/training phase and an inference phase. In the learning/training phase, a training algorithm is used to train a model to operate in accordance with patterns and/or associations based on, for example, training data. In general, the model(s) include(s) internal parameters that guide how input data is transformed into output data, such as through a series of nodes and connections within the model(s) to transform input data into output data. Additionally, hyperparameters are used as part of the training process to control how the learning is performed (e.g., a learning rate, a number of layers to be used in the machine learning model(s), etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, kernel duration ML/AI models and subsequent kernel ML/AI models are trained using supervised learning. However, any other training algorithm may additionally or alternatively be used. In examples disclosed herein, training is performed until the kernel duration ML/AI models and/or the subsequent kernel ML/AI models satisfy a threshold accuracy.

As described above, in the illustrated example of FIG. 1, the service provider 102 includes the training circuitry 108. In the example of FIG. 1, the training circuitry 108 is implemented by processor circuitry. In examples disclosed herein, training of kernel duration ML/AI models and/or the subsequent kernel ML/AI models is performed at the service provider 102 via the training circuitry 108. Training is performed using hyperparameters that control how the learning is performed (e.g., a learning rate, a number of layers to be used in the machine learning model(s), etc.). In examples disclosed herein, re-training of the kernel duration ML/AI models and/or the subsequent kernel ML/AI models is performed. Such re-training is performed after deployment (e.g., at the model execution circuitry 110), when new kernels are to be offloaded to accelerator circuitry (e.g., the accelerator circuitry 112).

The training circuitry 108 and the model execution circuitry 110 implement a two-phase learning approach. The first phase can be referred to as an offline training phase and the second phase can be referred to as an online learning and deployment phase. In both phases, the kernel duration model, the subsequent kernel model, the RL model, and/or the one or more peripheral components process an input stream of kernels arriving from general purpose processor circuitry for offloading to the accelerator circuitry 112. The input stream is represented as a sequence of tuples, where each arrived kernel is represented as a tuple. Kernel tuples include parameters identifying a source location or name of the kernel, properties of the arguments of the kernel, and/or a timestamp of when the kernel was submitted to be offloaded to accelerator circuitry. For a kernel k, the corresponding kernel tuple can be represented as $(S_k, A_k, T_k)$ where $S_k$ represents the source location and/or name of the kernel, $A_k$ represents properties of the arguments of the kernel, and $T_k$ represents the timestamp of when the kernel was submitted for offloading.

In the example first phase, the training circuitry 108 trains the kernel duration model and the subsequent kernel model offline with training data extracted from historical execution traces (e.g., from prior runs of a program). In examples disclosed herein, the training data originates from historical execution traces. As used herein, an execution trace refers to data representative of a prior execution of a kernel on hardware architecture. For example, execution traces may be collected by recording a predetermined number (e.g., 8, 16, etc.) of last conditional branches executed by a kernel and/or recording a predetermined amount (e.g., on the order of megabytes, on the order of gigabytes, etc.) of conditional branch information and several (e.g., millions) lines of instruction history. In some examples, execution traces are collected using oneAPI's clintercept program.

Because supervised training is used, the training data is labeled. Labeling may be applied to the training data by automatically. In some examples, the training data is preprocessed, for example, to determine execution traces, the source location or name of a kernel that was executed, properties of the arguments of the kernel, the time of submission of the kernel, the duration of execution of the kernel, and/or the occupancy of the kernel on accelerator circuitry. In some examples, the training data is sub-divided into a training set and a validation set.

The amount of training data may vary based on the application with which the ML/AI models are to be used. For example, applications will generally be repetitive (a) in which kernels are submitted and (b) in what order, with just a few minor variations. Although, programs go through phases of different behavior, the phases often repeat, so the ML/AI models can learn the general program patterns and use them to the advantage of the ML/AI models. As such, after an ML/AI model processes a series of kernels, the ML/AI model is likely to continue to see the same series of kernels in the future. These repeated patterns also tend to be reflected in the argument properties of kernels.

After training is complete, the model validation circuitry 206 deploys the kernel duration model and/or the subsequent kernel model for use as one or more executable constructs that process an input and provide an output based on the network of nodes and connections defined in the models. Included in the one or more executable constructs are instructions for implementing the RL model and/or one or more components that are peripheral to the kernel duration model, the subsequent kernel model, and/or the RL model. The instructions for implementing the RL model also define and a policy according to which the RL model learns (e.g., maximizing reward, minimizing reward, meeting a target reward, etc.). The models are stored at the user device 106. The model may then be executed by the model execution circuitry 110. After training, the deployed model(s) may be operated in an inference phase to process data.

For example, during an inference phase, the RL model determines where in a sequence of kernel offloads to insert a flush call. A flush call refers to the point at which the model execution circuitry 110 compute kernel offloads into a command list for submission to the accelerator circuitry 112. After a command list is created and submitted to the accelerator circuitry 112, there is a duration of latency overhead during which the accelerator circuitry 112 is not being utilized. This lost time is referred to as time cost C. The policy implemented by the RL model seeks to minimize the time cost by organizing multiple kernels into the same command list.

In examples disclosed herein, after initial training, the kernel duration model can predict a duration of execution of a kernel and/or an occupancy of the kernel. In some examples, peripheral components to the kernel duration model predict and/or otherwise determine an occupancy of the kernel. Also, after initial training, the subsequent kernel model can predict the submission time, source location and/or name, argument properties, and dependencies of the next kernel to arrive, using information from previously arrived kernels. In the inference phase, data to be analyzed (e.g., live data) is input to a model, and the model executes to create an output. This inference phase can be thought of as the AI "thinking" to generate the output based on what it learned from the training (e.g., by executing the model(s) to apply the learned patterns and/or associations to the live data).

In some examples, input data undergoes pre-processing before being used as an input to the machine learning model(s). Moreover, in some examples, the output data may undergo post-processing after it is generated by the AI model(s) to transform the output into a useful result (e.g., a display of data, an instruction to be executed by a machine, etc.). In additional or alternative examples, output of the deployed model(s) may be captured and provided as feedback. By analyzing feedback, the model execution circuitry 110 can continually adjust the kernel duration model and/or the subsequent kernel model. Additionally, by analyzing the feedback, an accuracy of the deployed model(s) can be determined. If the feedback indicates that the accuracy of the deployed model(s) is less than a threshold or other criterion, training (e.g., offline training) of updated model(s) can be triggered using the feedback and an updated training data set, hyperparameters, etc., to generate updated, deployed model(s).

In the illustrated example of FIG. 1, the user device 106 is implemented by a laptop computer. In additional or alternative examples, the user device 106 can be implemented by a mobile phone, a tablet computer, a desktop computer, a server, among others. As described above, the user device 106 includes model execution circuitry 110 and accelerator circuitry 112. In the example of FIG. 1, the model execution circuitry 110 is implemented by processor circuitry. The example model execution circuitry 110 executes and/or instantiates the one or more trained models 116 retrieved from the service provider 102 and the RL model included therewith as well as the one or more peripheral components. For example, the model execution circuitry 110 executes a kernel duration model, a subsequent kernel model, an RL model, and one or more peripheral components.

In the illustrated example of FIG. 1, the model execution circuitry 110 predicts, with the subsequent kernel model, a future kernel that is to be offloaded to the accelerator circuitry 112. By predicting the future kernel, the model execution circuitry 110 makes better scheduling decisions regarding whether to bundle kernels into command lists. For example, in addition to the kernel duration model and the subsequent kernel model, the model execution circuitry 110 implements a lightweight (e.g., computationally non-intensive) RL model that uses the duration, occupancy, and future kernel predictions to select an action (e.g., whether to bundle the current kernel and N previous kernels together into a command list. Reinforcement learning allows the model execution circuitry 110 to adapt the scheduling policy in an online fashion, according to new information and changes in a program.

In the illustrated example of FIG. 1, the accelerator circuitry 112 is implemented by a GPU. However, in additional or alternative examples, the accelerator circuitry 112 may be implemented by one or more DSPs, or one or more microcontrollers and integrated circuits such as one or more Application Specific Integrated Circuits (ASICs). In some examples, the accelerator circuitry 112 includes one or more analog or digital circuit(s), logic circuits, programmable processor(s), programmable controller(s), GPU(s), DSP(s), ASIC(s), programmable logic device(s) (PLD(s)), and/or field programmable logic device(s) (FPLD(s)). In the example of FIG. 1, the model execution circuitry 110 processes kernels in the order of submission and bundles the kernels into command lists to be offloaded to a driver of the accelerator circuitry 112. After the accelerator circuitry 112 receives a command list, the accelerator circuitry 112 can reorder kernels included therewith for better performance and utilization. Other implementations are possible.

In examples disclosed herein, one instance of the kernel duration model, one instance of the subsequent kernel model, and one instance of the RL model is implemented per one or more GPUs. For example, the example accelerator circuitry 112 implements a single GPU and the model execution circuitry 110 implements a single instance of the kernel duration model, a single instance of the subsequent kernel model, and a single instance of the RL model. In some examples, if the accelerator circuitry 112 implements two or more GPUs, the model execution circuitry 110 implements an instance of the kernel duration model, an instance of the subsequent kernel model, and an instance of the RL model for each GPU. However, other implementations are possible (e.g., multiple instances of models per accelerator, one instance of each model for multiple accelerators, etc.).

In the illustrated example of FIG. 1, the user device 106 subscribes to, purchases, and/or leases a product and/or service from the service provider 102 to access one or more machine learning models trained by the training circuitry 108. For example, the user device 106 of FIG. 1 accesses the one or more trained models by downloading the one or more models from the service provider 102, accessing a web-interface hosted by the service provider 102 and/or another device, among other techniques. In some examples, the user device 106 installs a plugin to implement a machine learning application. In such examples, the plugin implements the kernel duration model, the subsequent kernel model, and/or the RL model. In some examples, the user device 106 may access the kernel duration model, the subsequent kernel model, and/or the RL model as described above.

Figure 2:
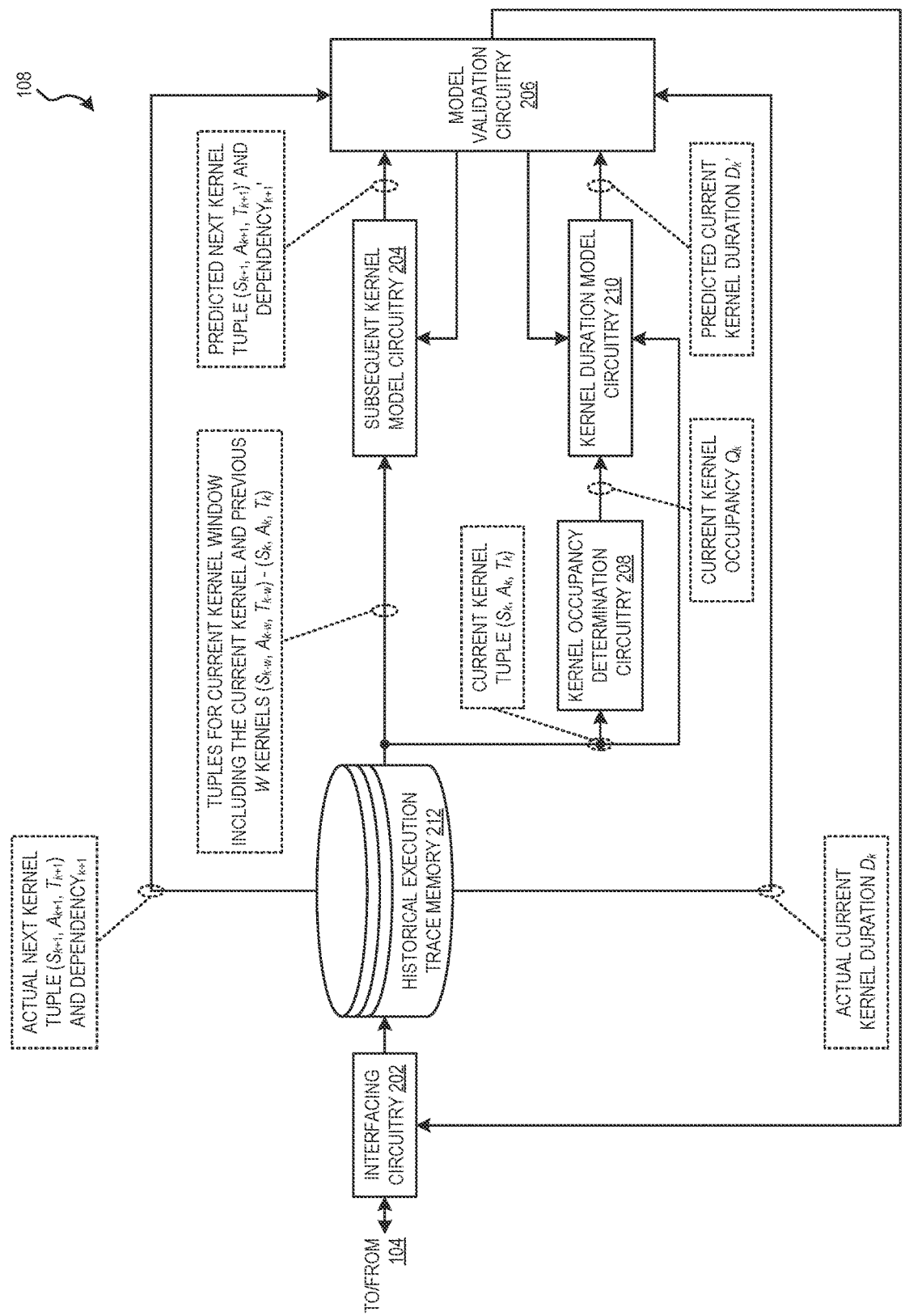
FIG. 2 is a block diagram illustrating an example implementation of the example training circuitry of FIG. 1.

FIG. 2 is a block diagram illustrating an example implementation of the example training circuitry 108 of FIG. 1 to train a kernel duration model and/or a subsequent kernel model. The training circuitry 108 includes example interfacing circuitry 202, example subsequent kernel model circuitry 204, example model validation circuitry 206, example kernel occupancy determination circuitry 208, example kernel duration model circuitry 210, and example historical execution trace memory 212. In the example of FIG. 2, the training circuitry 108 of FIG. 2 may be instantiated (e.g., creating an instance of, bring into being for any length of time, materialize, implement, etc.) by processor circuitry such as a central processor unit executing instructions.

Additionally or alternatively, the training circuitry 108 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example of FIG. 2, the interfacing circuitry 202 is coupled to the network 104 and the historical execution trace memory 212. In the example of FIG. 2, the interface circuitry 202 obtains training data from the network 104. For example, the interface circuitry 202 may collect execution traces from one or more clients who have agreed to share their data with a proprietor of the service provider 102. In additional or alternative examples, the interfacing circuitry 202 collects execution traces from devices communicating via the network 104 (e.g., when the network 104 is an enterprise network). In some examples, the interfacing circuitry 202 collects execution traces from processes being executed by the service provider 102.

In the illustrated example of FIG. 2, the interfacing circuitry 202 stores execution traces in the historical execution trace memory 212. In the example of FIG. 2, the interfacing circuitry 202 preprocesses execution traces before storing execution traces in the historical execution trace memory 212. In the example of FIG. 2, the interfacing circuitry 202 represents a kernel associated with an execution trace as a kernel tuple (e.g., the tuple ($S_k$, $A_k$, $T_k$) represents a kernel k).

In the illustrated example of FIG. 2, the interfacing circuitry 202 determines the source location or name ($S_k$) of a kernel. The source location or name of the kernel is indicative of a type of the kernel. Additionally, the example properties of the arguments parameter ($A_k$) of a kernel tuple represents the size of the data passed as an argument to the kernel. The interfacing circuitry 202 additionally divides the training data (e.g., the execution traces) into a training set and a validation set. For example, the interfacing circuitry 202 divides (e.g., separates, groups, etc.) the training data into a training set and a validation set after a threshold number of execution traces have been collected. In some examples, the interfacing circuitry 202 divides the training data into a first training set and a first validation set to be utilized when training the subsequent kernel model and a second training set and a second validation set to be utilized when training the kernel duration model. In other examples, the interfacing circuitry 202 divides the training data into one training set and one validation set to be utilized when training the subsequent kernel model and the kernel duration model.

In the illustrated example of FIG. 2, the subsequent kernel model circuitry 204 is coupled to the historical execution trace memory 212 and the model validation circuitry 206. In the example of FIG. 2, for the training set, the subsequent kernel model circuitry 204 selects tuples for a current kernel window including a first kernel (k) and the previous w kernels. For example, the subsequent kernel model circuitry 204 selects the following kernels illustrated in expression 1 below:

$$[(S_{k-w}, A_{k-w}, T_{k-w}), \ldots, (S_{k-1}, A_{k-1}, T_{k-1}), (S_k, A_k, T_k)] \quad \text{Expression 1}$$

In the example of FIG. 2, the subsequent kernel model circuitry 204 predicts the next kernel tuple and a dependency of the next kernel based on the source locations or names of the kernels, properties of the arguments, and times of submission of the kernels included in the current kernel window. For example, the subsequent kernel model circuitry 204 predicts the source location or name of the next kernel to arrive ($S_{k+1}$), argument properties ($A_{k+1}$) of the next kernel to arrive, the submission time ($T_{k+1}$) of the next kernel to arrive, and whether the next kernel k+1 is dependent on any of the kernels [m, k] currently waiting to be bundled into a command list, where m is the first kernel in the list of kernels waiting to be bundled. The predicted next kernel tuple is represented as ($S_{k+1}$, $A_{k+1}$, $T_{k+1}$)' and the predicted dependency of the next kernel is represented as dependency$_{k+1}$'.

In the example of FIG. 2, the subsequent kernel model circuitry 204 determines whether there is an additional kernel tuple in the training set. If the subsequent kernel model circuitry 204 determines that there is an additional kernel tuple in the training set, the subsequent kernel model circuitry 204 selects tuples for next kernel window including the next kernel and the previous w kernels (e.g., (e.g., ($S_{k+1-w}$, $A_{k+1-w}$, $T_{k+1-w}$)) and predicts a kernel tuple that would follow that kernel window (e.g., a subsequent kernel tuple) and the dependency of the next kernel.

In the illustrated example of FIG. 2, the subsequent kernel model circuitry 204 continues shifting the kernel window through the training set and predicting the subsequent kernel tuple and dependency of the subsequent kernel until there are no additional kernel tuples in the training set. In the example of FIG. 2, the subsequent kernel model circuitry 204 selects kernel windows from the validation set and predicts subsequent kernels and associated dependencies. The subsequent kernel model circuitry 204 slides the kernel window through the validation set until there are no additional kernel tuples in the validation set.

In the illustrated example of FIG. 2, the model validation circuitry 206 is coupled to the subsequent kernel model circuitry 204, the kernel duration model circuitry 210, the historical execution trace memory 212, and the interfacing circuitry 202. In the example of FIG. 2, the model validation circuitry 206 adjusts one or more of the kernel duration model or the subsequent kernel model based on the error between predicted values and actual values. For example, for the subsequent kernel model, the model validation circuitry 206 determines an error for a predicted next kernel tuple and predicted dependency of the next kernel in the training set based on the execution trace of the actual next kernel. In response to the subsequent kernel model circuitry 204 determining that there are no additional tuples in the training set for the subsequent kernel model, the model validation circuitry 206 backpropagates, through the subsequent kernel model, the error for each predicted next kernel tuple and each predicted dependency of the next kernel associated with the training set. For example, the model validation circuitry 206 determines gradients for the weights of each layer of the subsequent kernel model, starting at the last layer, with respect to a loss function of the subsequent kernel model. The model validation circuitry 206 then implements stochastic gradient descent with respect to the loss function.

In the illustrated example of FIG. 2, the model validation circuitry 206 determines an error for a predicted next kernel tuple and predicted dependency of the next kernel in the validation set based on the execution trace of the actual next kernel. In the example of FIG. 2, in response to the subsequent kernel model circuitry 204 determining that there are no additional tuples in the validation set, the model validation circuitry 206 determines whether the subsequent kernel model satisfies a threshold accuracy of the predicted next kernel tuple and the predicted dependency of the next kernel. In response to the model validation circuitry 206 determining that the subsequent kernel model does not satisfy the threshold accuracy of the predicted next kernel tuple and the predicted dependency of the next kernel, the model validation circuitry 206 adjusts parameters of the subsequent kernel model to satisfy the threshold accuracy. In response to the model validation circuitry 206 determining that the subsequent kernel model satisfies the threshold accuracy of the predicted next kernel tuple and the predicted dependency of the next kernel, the model validation circuitry 206 deploys the subsequent kernel model. For example, the model validation circuitry 206 causes transmission (via the interfacing circuitry 202) of the subsequent kernel model to the model execution circuitry 110.

In the illustrated example of FIG. 2, for the kernel duration model, the model validation circuitry 206 determines an error for a predicted duration of execution of the kernel in the training set based on the execution trace of the kernel. In response to the kernel occupancy determination circuitry 208 determining that there are no additional tuples in the training set for the kernel duration model, the model validation circuitry 206 backpropagates, through the kernel duration model, the error for predicted duration of execution of each kernel of the training set.

In the illustrated example of FIG. 2, the model validation circuitry 206 determines an error for a predicted duration of execution of the kernel in the validation set based on the execution trace of the kernel. In the example of FIG. 2, in response to the kernel occupancy determination circuitry 208 determining that there are no additional tuples in the validation set for the kernel duration model, the model validation circuitry 206 determines whether the kernel duration model satisfies a threshold accuracy of the predicted duration of execution of each kernel in the validation set for the kernel duration model. In response to the model validation circuitry 206 determining that the kernel duration model does not satisfy the threshold accuracy of the predicted duration of execution of each kernel in the validation set, the model validation circuitry 206 adjusts parameters of the kernel duration model to satisfy the threshold accuracy. In response to the model validation circuitry 206 determining that the kernel duration model satisfies the threshold accuracy of the predicted duration of execution of each kernel in the validation set, the model validation circuitry 206 deploys the kernel duration model. For example, the model validation circuitry 206 causes transmission (via the interfacing circuitry 202) of the kernel duration model to the model execution circuitry 110.

In the illustrated example of FIG. 2, the kernel occupancy determination circuitry 208 is coupled to the historical execution trace memory 212 and the kernel duration model circuitry 210. In the example of FIG. 2, the kernel occupancy determination circuitry 208 selects a first kernel tuple for a current kernel of the training set. The kernel occupancy determination circuitry 208 determines an occupancy of the selected kernel based on the properties of the arguments of the selected kernel. For example, when a kernel k arrives to be offloaded, the kernel occupancy determination circuitry 208 predicts an occupancy of the kernel on accelerator circuitry. The predicted occupancy of a kernel k is represented as $Q_k$. As the occupancy ($Q_k$) of a kernel is a static property of the properties of the arguments ($A_k$) of the kernel, the kernel occupancy determination circuitry 208 determines the occupancy ($Q_k$) via a function g that operates on the properties of the arguments ($A_k$) of the kernel to determine how much of an accelerator the kernel k will request (e.g., $Q_k=g(A_k)$).

In the example of FIG. 2, the kernel occupancy determination circuitry 208 determines whether there is an additional kernel tuple in the training set. If the kernel occupancy determination circuitry 208 determines that there is an additional kernel tuple in the training set, the kernel occupancy determination circuitry 208 selects the next tuple and determines the occupancy of the next kernel based on the properties of the arguments of the next kernel.

In the illustrated example of FIG. 2, the kernel occupancy determination circuitry 208 continues shifting (e.g., iterating, parsing, etc.) through the training set and the occupancy of kernels until there are no additional kernel tuples in the training set. In the example of FIG. 2, the kernel occupancy determination circuitry 208 selects kernel tuples from the validation set and determines kernel occupancies. The kernel occupancy determination circuitry 208 iterates through the validation set until there are no additional kernel tuples in the validation set.

In the illustrated example of FIG. 2, the kernel duration model circuitry 210 is coupled to the historical execution trace memory 212, the kernel occupancy determination circuitry 208, and the model validation circuitry 206. In the example of FIG. 2, the kernel duration model circuitry 210 retrieves and/or obtains the kernel occupancy ($Q_k$) determined by the kernel occupancy determination circuitry 208. For both the training set and the validation set, the example kernel duration model circuitry 210 predicts the duration of execution of kernels based on the source location or name of a kernel, the properties of the arguments of the kernel, and the occupancy of the kernel. The predicted duration of execution is represented as $D_k'$.

Execution duration ($D_k$) is a complex property that may be approximated with some static analysis. For example, a matrix-multiply kernel will likely have a runtime complexity of $O(A^3)$. In such an example, if the size of the input data to the kernel is two bytes, the kernel will perform eight operations. However, execution duration ($D_k$) may vary based on runtime conditions, implementation details, and values used (e.g., a sparse matrix having more zero values than non-zero values) will likely run in a shorter amount of time than a dense matrix (e.g., having more non-zero values than zero values). Occupancy of accelerator circuitry also impacts execution duration ($D_k$). Accordingly, the kernel duration model circuitry 210 predicts execution duration via a function $f$ that operates on the source location or name ($S_k$) of a kernel, properties of arguments of the kernel ($A_k$), and kernel occupancy ($Q_k$) (e.g., $D_k'=f(S_k, A_k, Q_k)$).

In the illustrated example of FIG. 2, the historical execution trace memory 212 stores execution traces included in the training data. The historical execution trace memory 212 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The historical execution trace memory 212 may additionally or alternatively be implemented by one or more double data rate (DDR) memories, such as DDR, DDR2, DDR3, DDR4, DDR5, mobile DDR (mDDR), DDR SDRAM, etc. The historical execution trace memory 212 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the historical execution trace memory 212 is illustrated as a single database, the historical execution trace memory 212 may be implemented by any number and/or type(s) of databases. Furthermore, the data stored in the historical execution trace memory 212 may be in any data format such as, for example, binary data, comma delimited data, tab delimited data, structured query language (SQL) structures, etc.

In some examples, the training circuitry 108 includes means for interfacing. For example, the means for interfacing may be implemented by the interfacing circuitry 202. In some examples, the interfacing circuitry 202 may be instantiated by processor circuitry such as the example processor circuitry 912 of FIG. 9. For instance, the interfacing circuitry 202 may be instantiated by the example general purpose microprocessor circuitry 1000 of FIG. 10 executing machine executable instructions such as that implemented by at least blocks 602 and 604 of FIG. 6 and/or at least blocks 702 and 704 of FIG. 7. In some examples, the interfacing circuitry 202 may be instantiated by hardware logic circuitry, which may be implemented by an ASIC or the FPGA circuitry 1100 of FIG. 11 structured to perform operations corresponding to the machine readable instructions. Additionally or alternatively, the interfacing circuitry 202 may be instantiated by any other combination of hardware, software, and/or firmware. For example, the interfacing circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training circuitry 108 includes means for executing a subsequent kernel model. For example, the means for executing a subsequent kernel model may be implemented by the subsequent kernel model circuitry 204. In some examples, the subsequent kernel model circuitry 204 may be instantiated by processor circuitry such as the example processor circuitry 912 of FIG. 9. For instance, the subsequent kernel model circuitry 204 may be instantiated by the example general purpose microprocessor circuitry 1000 of FIG. 10 executing machine executable instructions such as that implemented by at least blocks 606, 608, 612, 614, 618, 620, 624, and 626 of FIG. 6. In some examples, the subsequent kernel model circuitry 204 may be instantiated by hardware logic circuitry, which may be implemented by an ASIC or the FPGA circuitry 1100 of FIG. 11 structured to perform operations corresponding to the machine readable instructions. Additionally or alternatively, the subsequent kernel model circuitry 204 may be instantiated by any other combination of hardware, software, and/or firmware. For example, the subsequent kernel model circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training circuitry 108 includes means for validating one or more machine learning models. For example, the means for validating one or more machine learning models may be implemented by the model validation circuitry 206. In some examples, the model validation circuitry 206 may be instantiated by processor circuitry such as the example processor circuitry 912 of FIG. 9. For instance, the model validation circuitry 206 may be instantiated by the example general purpose microprocessor circuitry 1000 of FIG. 10 executing machine executable instructions such as that implemented by at least blocks 610, 616, 622, 628, 630, and 632 of FIG. 6 and/or at least blocks 712, 718, 726, 732, 734, and 736 of FIG. 7. In some examples, the model validation circuitry 206 may be instantiated by hardware logic circuitry, which may be implemented by an ASIC or the FPGA circuitry 1100 of FIG. 11 structured to perform operations corresponding to the machine readable instructions. Additionally or alternatively, the model validation circuitry 206 may be instantiated by any other combination of hardware, software, and/or firmware. For example, the model validation circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training circuitry 108 includes means for determining kernel occupancy. For example, the means for determining kernel occupancy may be implemented by the kernel occupancy determination circuitry 208. In some examples, the kernel occupancy determination circuitry 208 may be instantiated by processor circuitry such as the example processor circuitry 912 of FIG. 9. For instance, the kernel occupancy determination circuitry 208 may be instantiated by the example general purpose microprocessor circuitry 1000 of FIG. 10 executing machine executable instructions such as that implemented by at least blocks 706, 708, 714, 716, 720, 722, 728, and 730 of FIG. 7. In some examples, the kernel occupancy determination circuitry 208 may be instantiated by hardware logic circuitry, which may be implemented by an ASIC or the FPGA circuitry 1100 of FIG. 11 structured to perform operations corresponding to the machine readable instructions. Additionally or alternatively, the kernel occupancy determination circuitry 208 may be instantiated by any other combination of hardware, software, and/or firmware. For example, the kernel occupancy determination circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training circuitry 108 includes means for executing a kernel duration model. For example, the means for executing a kernel duration model may be implemented by the kernel duration model circuitry 210. In some examples, the kernel duration model circuitry 210 may be instantiated by processor circuitry such as the example processor circuitry 912 of FIG. 9. For instance, the kernel duration model circuitry 210 may be instantiated by the example general purpose microprocessor circuitry 1000 of FIG. 10 executing machine executable instructions such as that implemented by at least blocks 710 and 724 of FIG. 7. In some examples, the kernel duration model circuitry 210 may be instantiated by hardware logic circuitry, which may be implemented by an ASIC or the FPGA circuitry 1100 of FIG. 11 structured to perform operations corresponding to the machine readable instructions. Additionally or alternatively, the kernel duration model circuitry 210 may be instantiated by any other combination of hardware, software, and/or firmware. For example, the kernel duration model circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
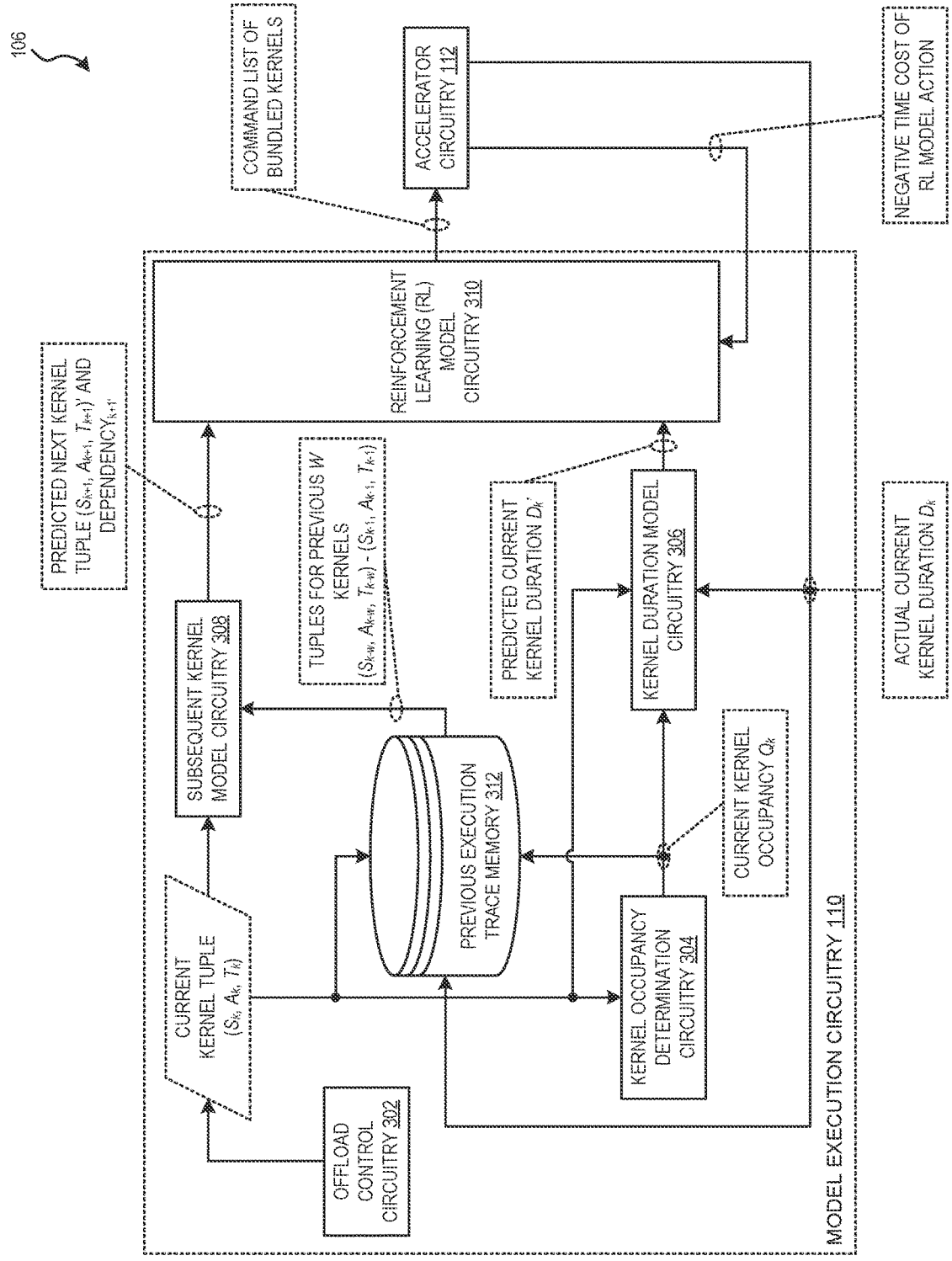
FIG. 3 is a block diagram illustrating an example implementation of the example model execution circuitry of FIG. 1.

FIG. 3 is a block diagram illustrating an example implementation of the example model execution circuitry 110 of FIG. 1 to generate command lists to be offloaded to the accelerator circuitry 112. The model execution circuitry 110 includes example offload control circuitry 302, example kernel occupancy determination circuitry 304, example kernel duration model circuitry 306, example subsequent kernel model circuitry 308, example reinforcement learning (RL) model circuitry 310, and example previous execution trace memory 312. In the example of FIG. 3, the model execution circuitry 110 of FIG. 3 may be instantiated (e.g., creating an instance of, bring into being for any length of time, materialize, implement, etc.) by processor circuitry such as a central processor unit executing instructions.

Additionally or alternatively, the model execution circuitry 110 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the offload control circuitry 302 is coupled to a host executing portions of a program on generic processor circuitry (e.g., a CPU) and the previous execution trace memory 312. In the example of FIG. 3, the offload control circuitry 302 obtains kernels that are to be offloaded to the accelerator circuitry 112. In some examples, the offload control circuitry 302 preprocesses kernels to generate tuples (e.g., $(S_k, A_k, T_k)$).

In the illustrated example of FIG. 3, the kernel occupancy determination circuitry 304 is coupled to the offload control circuitry 302, the kernel duration model circuitry 306, and the previous execution trace memory 312. In the example of FIG. 3, the kernel occupancy determination circuitry 304 determines an occupancy of kernels that are to be offloaded based on the properties of the arguments of the kernels.

For example, when a kernel k arrives to be offloaded, the kernel occupancy determination circuitry 304 predicts an occupancy of the kernel on the accelerator circuitry 112. The predicted occupancy of a kernel k is represented as $Q_k$. To determine the occupancy ($Q_k$) of a kernel, the kernel occupancy determination circuitry 304 executes and/or instantiates a function g that operates on the properties of the arguments ($A_k$) of the kernel to determine how much of an accelerator the kernel k will request (e.g., $Q_k=g(A_k)$). For example, the kernel occupancy determination circuitry 304 may implement instructions included with the one or more executable constructs of the kernel duration model and the subsequent kernel model.

In the illustrated example of FIG. 3, the kernel duration model circuitry 306 is coupled to the offload control circuitry 302, the kernel occupancy determination circuitry 304, the RL model circuitry 310, and the accelerator circuitry 112. In the example of FIG. 3, the kernel duration model circuitry 306 executes and/or instantiates the kernel duration model trained by the training circuitry 108. In the example of FIG. 3, the kernel duration model circuitry 306 retrieves and/or obtains the kernel occupancy ($Q_k$) determined by the kernel occupancy determination circuitry 304. The example kernel duration model circuitry 306 predicts the duration of execution of kernels based on the source location or name of a kernel, the properties of the arguments of the kernel, and the occupancy of the kernel. The predicted duration of execution is represented as $D_k'$.

In the illustrated example of FIG. 3, after a first kernel completes executing on the accelerator circuitry 112, the kernel duration model circuitry 306 retrieves and/or obtains the actual duration of execution of the first kernel. For example, the kernel duration model circuitry 306 determines a difference (e.g., a duration difference) between the actual duration of execution of the first kernel and the predicted duration of execution of the first kernel. Based on the duration difference, the kernel duration model circuitry 306 adjusts one or more parameters of the kernel duration model. For example, the kernel duration model circuitry 306 generates a loss value based on the duration difference and implements backpropagation to adjust the kernel duration model to learn from the new runtime datapoint.

In the illustrated example of FIG. 3, the subsequent kernel model circuitry 308 is coupled to the offload control circuitry 302, the RL model circuitry 310, and the previous execution trace memory 312. In the example of FIG. 3, for a kernel (e.g., a current kernel) that is to be offloaded to the accelerator circuitry 112, the subsequent kernel model circuitry 308 obtains tuples for the kernel window (e.g., current kernel window) including the current kernel and the previous w kernels.

In the example of FIG. 3, the subsequent kernel model circuitry 308 predicts the next kernel tuple and a dependency of the next kernel based on the source locations or names of the kernels, properties of the arguments, and times of submission of the kernels included in the current kernel window. For example, the subsequent kernel model circuitry 204 predicts the source location or name of the next kernel to arrive ($S_{k+1}$), argument properties ($A_{k+1}$) of the next kernel to arrive, the submission time ($T_{k+1}$) of the next kernel to arrive, and whether the next kernel k+1 is dependent on any of the kernels [m, k] currently waiting to be bundled into a command list, where m is the first kernel in the list of kernels waiting to be bundled. The predicted next kernel tuple is represented as $(S_{k+1}, A_{k+1}, T_{k+1})'$ and the predicted dependency of the next kernel is represented as $dependency_{k+1}'$.

In the example of FIG. 3, when the subsequent kernel model circuitry 308 retrieves and/or obtains the next kernel tuple from the offload control circuitry 302, the subsequent kernel model circuitry 308 determines a difference between the actual next kernel tuple (e.g., an actual tuple of the next kernel) and the predicted next kernel tuple as well as a difference between the actual dependency of the next kernel and the predicted dependency of the next kernel. Based on the differences, the subsequent kernel model circuitry 308 adjusts one or more parameters of the subsequent kernel model. For example, the subsequent kernel model circuitry 308 generates a loss value based on the differences and implements backpropagation to adjust the subsequent kernel model to learn from the new runtime datapoint. For example, the model validation circuitry 206 determines gradients for the weights of each layer of the subsequent kernel model, starting at the last layer, with respect to a loss function of the subsequent kernel model. The model validation circuitry 206 then implements stochastic gradient descent with respect to the loss function.

In the illustrated example of FIG. 3, the RL model circuitry 310 is coupled to the kernel duration model circuitry 306, the subsequent kernel model circuitry 308, and the accelerator circuitry 112. In the example of FIG. 3, the RL model circuitry 310 implements the instructions for the RL model included with the executable constructs of the kernel duration model and the subsequent kernel model. For example, the RL model circuitry 310 implements a computationally non-intensive (e.g., lightweight) online RL model to decide whether to bundle kernels into a command list to send to a driver of the accelerator circuitry 112 (e.g., a GPU driver), or to keep the command list open.

In the illustrated example of FIG. 3, by implementing a computationally non-intensive RL model, computational resource consumption of the model execution circuitry 110 is reduced (e.g., minimized) despite implementing a learning algorithm during deployment. In this manner, the model execution circuitry 110 can maintain a net decrease in computation resource consumption and time cost. In the illustrated example of FIG. 3, the RL model circuitry 310 determines whether to bundle (a) the current kernel being evaluated and (b) any previously received kernels since the last flush call into a command list based on (i) the predicted duration of execution of the duration kernel, (ii) the predicted tuple of the next kernel, and/or (iii) the predicted dependency of the next kernel.

In the illustrated example of FIG. 3, after a bundling decision, the RL model circuitry 310 obtains the negative time cost associated with the bundling decision. In the example of FIG. 3, the RL model circuitry 310 (e.g., reinforcement learning model circuitry) implements a reward policy that reflects the negative time cost of the decision regarding whether to bundle the previous kernel into a command list or to leave the command list open to accumulate more kernels. As such, the RL model circuitry 310 captures the latency from time of kernel submission ($T_k$) to time of kernel return from the accelerator circuitry 112. The reward policy of the RL model can be initialized to a user-determined policy. Based on the negative time cost, the RL model circuitry 310 adjusts one or more parameters of the RL model according to the reward policy. As such, the reward policy can be considered to be initialized as a "starter" policy that the RL model adapts over time.

In the example of FIG. 3, the predicted next kernel tuple, the predicted dependencies of the next kernel, and/or the predicted duration of execution of the next kernel assist the RL model in deciding whether to bundle (e.g., issue a flush call) and send a command list or to wait for future kernels before bundling. For example, when bundling kernels for offloading to the accelerator circuitry 112 during deployment, dependencies between kernels or manual user-issued flush commands may cause the accelerator circuitry 112 to force a flush (e.g., distribution, deployment, etc.) of the existing kernels waiting to be bundled into a command list. For example, if the input to a first kernel includes the output of a second kernel, the first kernel must wait for the second kernel to complete execution before the first kernel can begin executing. As such, a flush may be forced in such an example. If an incoming kernel is part of a dependency that forces a flush of existing kernels, performance may be improved by bundling existing kernels (e.g., kernels that have already arrived) instead of waiting for the bundling action to be forced by a later arriving kernel. In doing so, the RL model can optimize the arrangement of the next command list while maintaining flushes between kernel dependencies. Decision to (a) keep a command list open or (b) close the command list is part of the scheduling heuristics that the RL model learns during operation. If the decision is to close the command list, the RL model circuitry 310 sends the command list to a driver of the accelerator circuitry 112 when the RL model encounters a dependency.

In the illustrated example of FIG. 3, the previous execution trace memory 312 stores execution traces of kernels that previously executed on the accelerator circuitry 112. The previous execution trace memory 312 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The previous execution trace memory 312 may additionally or alternatively be implemented by one or more double data rate (DDR) memories, such as DDR, DDR2, DDR3, DDR4, DDR5, mobile DDR (mDDR), DDR SDRAM, etc. The previous execution trace memory 312 may additionally or alternatively be implemented by one or more mass storage devices such as hard disk drive(s) (HDD(s)), compact disk (CD) drive(s), digital versatile disk (DVD) drive(s), solid-state disk (SSD) drive(s), Secure Digital (SD) card(s), CompactFlash (CF) card(s), etc. While in the illustrated example the previous execution trace memory 312 is illustrated as a single database, the previous execution trace memory 312 may be implemented by any number and/or type(s) of databases. Furthermore, the data stored in the previous execution trace memory 312 may be in any data format such as, for example, binary data, comma delimited data, tab delimited data, structured query language (SQL) structures, etc.

In some examples, the model execution circuitry 110 includes means for controlling kernel offload. For example, the means for controlling kernel offload may be implemented by the offload control circuitry 302. In some examples, the offload control circuitry 302 may be instantiated by processor circuitry such as the example processor circuitry 1212 of FIG. 12. For instance, the offload control circuitry 302 may be instantiated by the example general purpose microprocessor circuitry 1300 of FIG. 13 executing machine executable instructions such as that implemented by at least blocks 802, 814, and 826 of FIG. 8. In some examples, the offload control circuitry 302 may be instantiated by hardware logic circuitry, which may be implemented by an ASIC or the FPGA circuitry 1400 of FIG. 14 structured to perform operations corresponding to the machine readable instructions. Additionally or alternatively, the offload control circuitry 302 may be instantiated by any other combination of hardware, software, and/or firmware. For example, the offload control circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the model execution circuitry 110 includes means for determining kernel occupancy. For example, the means for determining kernel occupancy may be implemented by the kernel occupancy determination circuitry 304. In some examples, the kernel occupancy determination circuitry 304 may be instantiated by processor circuitry such as the example processor circuitry 1212 of FIG. 12. For instance, the kernel occupancy determination circuitry 304 may be instantiated by the example general purpose microprocessor circuitry 1300 of FIG. 13 executing machine executable instructions such as that implemented by at least block 804 of FIG. 8. In some examples, the kernel occupancy determination circuitry 304 may be instantiated by hardware logic circuitry, which may be implemented by an ASIC or the FPGA circuitry 1400 of FIG. 14 structured to perform operations corresponding to the machine readable instructions. Additionally or alternatively, the kernel occupancy determination circuitry 304 may be instantiated by any other combination of hardware, software, and/or firmware. For example, the kernel occupancy determination circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the model execution circuitry 110 includes means for executing a kernel duration model. For example, the means for executing a kernel duration model may be implemented by the kernel duration model circuitry 306. In some examples, the kernel duration model circuitry 306 may be instantiated by processor circuitry such as the example processor circuitry 1212 of FIG. 12. For instance, the kernel duration model circuitry 306 may be instantiated by the example general purpose microprocessor circuitry 1300 of FIG. 13 executing machine executable instructions such as that implemented by at least blocks 806, 820, 822, and 824 of FIG. 8. In some examples, the kernel duration model circuitry 306 may be instantiated by hardware logic circuitry, which may be implemented by an ASIC or the FPGA circuitry 1400 of FIG. 14 structured to perform operations corresponding to the machine readable instructions. Additionally or alternatively, the kernel duration model circuitry 306 may be instantiated by any other combination of hardware, software, and/or firmware. For example, the kernel duration model circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the model execution circuitry 110 includes means for executing a subsequent kernel model. For example, the means for executing a subsequent kernel model may be implemented by the subsequent kernel model circuitry 308. In some examples, the subsequent kernel model circuitry 308 may be instantiated by processor circuitry such as the example processor circuitry 1212 of FIG. 12. For instance, the subsequent kernel model circuitry 308 may be instantiated by the example general purpose microprocessor circuitry 1300 of FIG. 13 executing machine executable instructions such as that implemented by at least blocks 808, 810, 828, and 830 of FIG. 8. In some examples, the subsequent kernel model circuitry 308 may be instantiated by hardware logic circuitry, which may be implemented by an ASIC or the FPGA circuitry 1400 of FIG. 14 structured to perform operations corresponding to the machine readable instructions. Additionally or alternatively, the subsequent kernel model circuitry 308 may be instantiated by any other combination of hardware, software, and/or firmware. For example, the subsequent kernel model circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the model execution circuitry 110 includes means for executing a reinforcement learning (RL) model. For example, the means for executing a RL model may be implemented by the RL model circuitry 310. In some examples, the RL model circuitry 310 may be instantiated by processor circuitry such as the example processor circuitry 1212 of FIG. 12. For instance, the RL model circuitry 310 may be instantiated by the example general purpose microprocessor circuitry 1300 of FIG. 13 executing machine executable instructions such as that implemented by at least blocks 812, 816, and 818 of FIG. 8. In some examples, the RL model circuitry 310 may be instantiated by hardware logic circuitry, which may be implemented by an ASIC or the FPGA circuitry 1400 of FIG. 14 structured to perform operations corresponding to the machine readable instructions. Additionally or alternatively, the RL model circuitry 310 may be instantiated by any other combination of hardware, software, and/or firmware. For example, the RL model circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
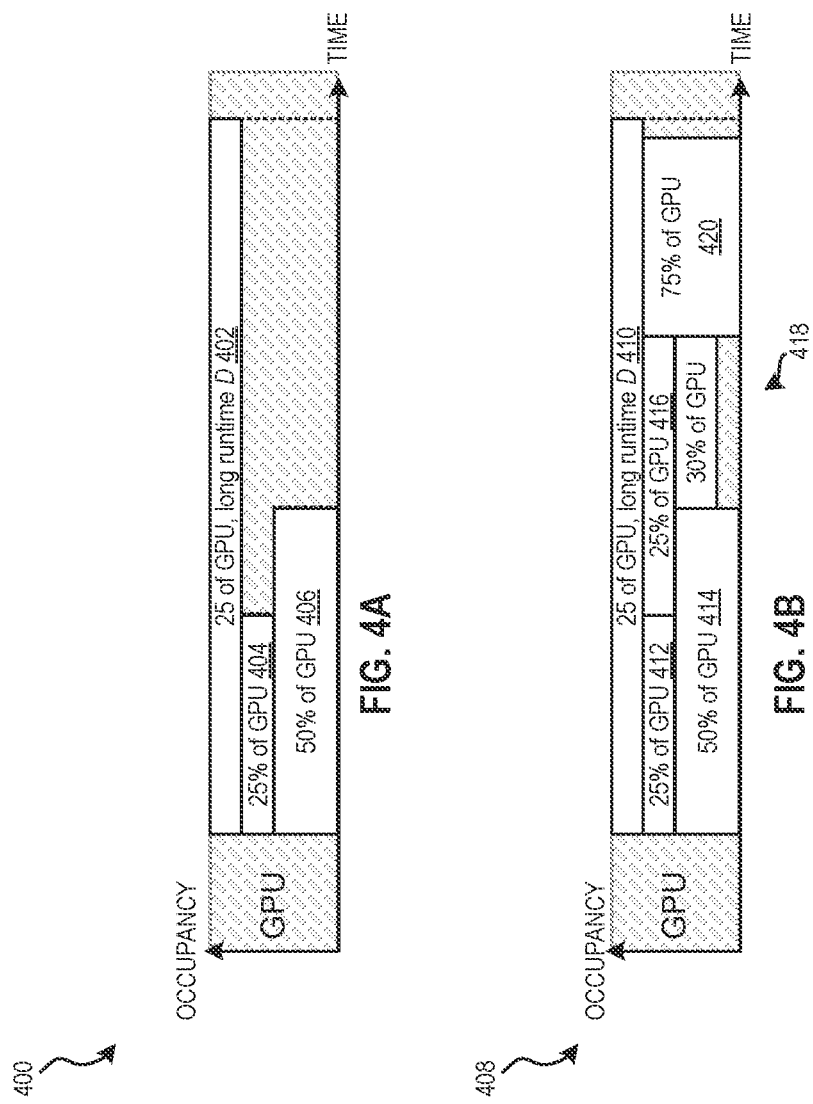
FIG. 4A is a graphical illustration representative of graphics processor unit utilization when implementing existing techniques.
FIG. 4B is a graphical illustration representative of graphics processor unit utilization when implementing examples disclosed herein.

FIG. 4A is a graphical illustration 400 representative of GPU utilization when implementing existing techniques. The graphical illustration 400 includes an occupancy axis and a time axis. In the example of FIG. 4A, a first kernel 402, a second kernel 404, and a third kernel 406 are scheduled onto the GPU. In the example of FIG. 4A, existing techniques achieve poor GPU utilization due to one long-duration and low-occupancy kernels. For example, the first kernel 402 has a much longer duration of execution than the second kernel 404 and the third kernel 406. Additionally, the third kernel 406 has much higher utilization than the first kernel 402 and the second kernel 404. Accordingly, the command list of FIG. 4A is non-optimally bundled because one long-duration and low-occupancy compute kernel dominates execution at the GPU.

FIG. 4B is a graphical illustration 408 representative of GPU utilization when implementing examples disclosed herein. The graphical illustration 408 includes an occupancy axis and a time axis. In the example of FIG. 4B, a first kernel 410, a second kernel 412, a third kernel 414, a fourth kernel 416, a fifth kernel 418, and a sixth kernel 420 are scheduled onto the GPU. FIG. 4B illustrated a more optimized bundle achieved as disclosed herein. In the example of FIG. 4B, the command list includes more kernels so that the GPU has a greater utilization.

As described above, execution duration and GPU occupancy of a given kernel may be useful in determining how to bundle kernels because it is computationally beneficial to keep the GPU active and utilized as much as possible. Additionally, the GPU generally must finish one command list before starting the next. As such, examples disclosed herein strive for command lists that have enough volume to give the GPU enough tasks to keep itself occupied, but properly created such that for any given kernel, the latency between the submission time of that kernel and the time the GPU returns the kernel is reduced and/or appropriately minimal.

Additionally, examples disclosed herein avoid excessive GPU idling during the time cost C that is incurred every time a command list is created and submitted to the GPU. Examples disclosed herein schedule kernels into a command list such that independent kernels can run in parallel on different threads of accelerator circuitry, utilizing more occupancy of the accelerator circuitry (e.g., GPU) than existing technique. Examples disclosed herein also schedule command lists to complete parallel kernels at around the same time, so that a few long-running tasks do not force the accelerator circuitry (e.g., GPU) to operate with reduced utilization while it waits for the command list to complete.

Figure 5:
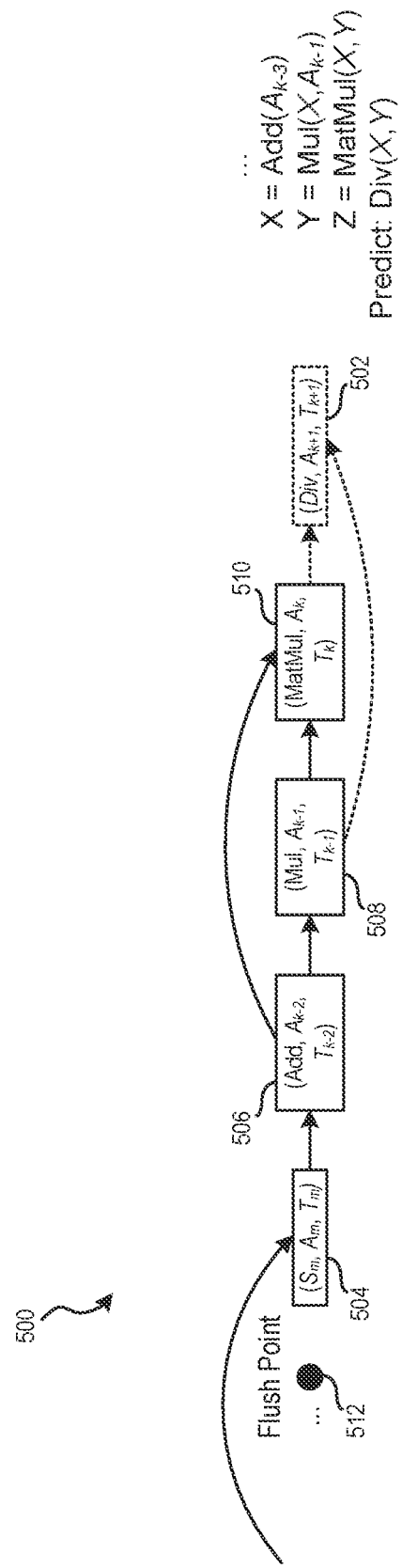
FIG. 5 is an example illustration of a sequence of kernel tuples and a predicted kernel tuple in accordance with teachings of this disclosure.

FIG. 5 is an example illustration of a sequence 500 of kernel tuples and a predicted kernel tuple 502 in accordance with teachings of this disclosure. For example, the subsequent kernel model circuitry 308 predicts the predicted kernel tuple 502 based on a first tuple 504, a second tuple 506, a third tuple 508, and a fourth tuple 510 received after a last flush call 512.

While an example manner of implementing the training circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Additionally, while an example manner of implementing the model execution circuitry 110 of FIG. 1 is illustrated in FIG. 3, one or more of the elements, processes, and/or devices illustrated in FIG. 3 may be combined, divided, re-arranged, omitted, eliminated, and/or implemented in any other way. Further, the example interfacing circuitry 202, the example subsequent kernel model circuitry 204, the example model validation circuitry 206, the example kernel occupancy determination circuitry 208, the example kernel duration model circuitry 210, the example historical execution trace memory 212, and/or, more generally, the example training circuitry 108 of FIGS. 1 and/or 2 and/or the example offload control circuitry 302, the example kernel occupancy determination circuitry 304, the example kernel duration model circuitry 306, the example subsequent kernel model circuitry 308, the example RL model circuitry 310, the example previous execution trace memory 312, and/or, more generally, the example model execution circuitry 110 of FIGS. 1 and/or 3. may be implemented by hardware alone or by hardware in combination with software and/or firmware. Thus, for example, any of the example interfacing circuitry 202, the example subsequent kernel model circuitry 204, the example model validation circuitry 206, the example kernel occupancy determination circuitry 208, the example kernel duration model circuitry 210, the example historical execution trace memory 212, and/or, more generally, the example training circuitry 108 of FIGS. 1 and/or 2 and/or the example offload control circuitry 302, the example kernel occupancy determination circuitry 304, the example kernel duration model circuitry 306, the example subsequent kernel model circuitry 308, the example RL model circuitry 310, the example previous execution trace memory 312, and/or, more generally, the example model execution circuitry 110 of FIGS. 1 and/or 3, could be implemented by processor circuitry, analog circuit(s), digital circuit(s), logic circuit(s), programmable processor(s), programmable microcontroller(s), graphics processor unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example training circuitry 108 of FIG. 1 may include one or more elements, processes, and/or devices in addition to, or instead of, those illustrated in FIG. 2, and/or may include more than one of any or all of the illustrated elements, processes and devices. Additionally, the example model execution circuitry 110 of FIG. 1 may include one or more elements, processes, and/or devices in addition to, or instead of, those illustrated in FIG. 3, and/or may include more than one of any or all of the illustrated elements, processes and devices.

Figure 6:
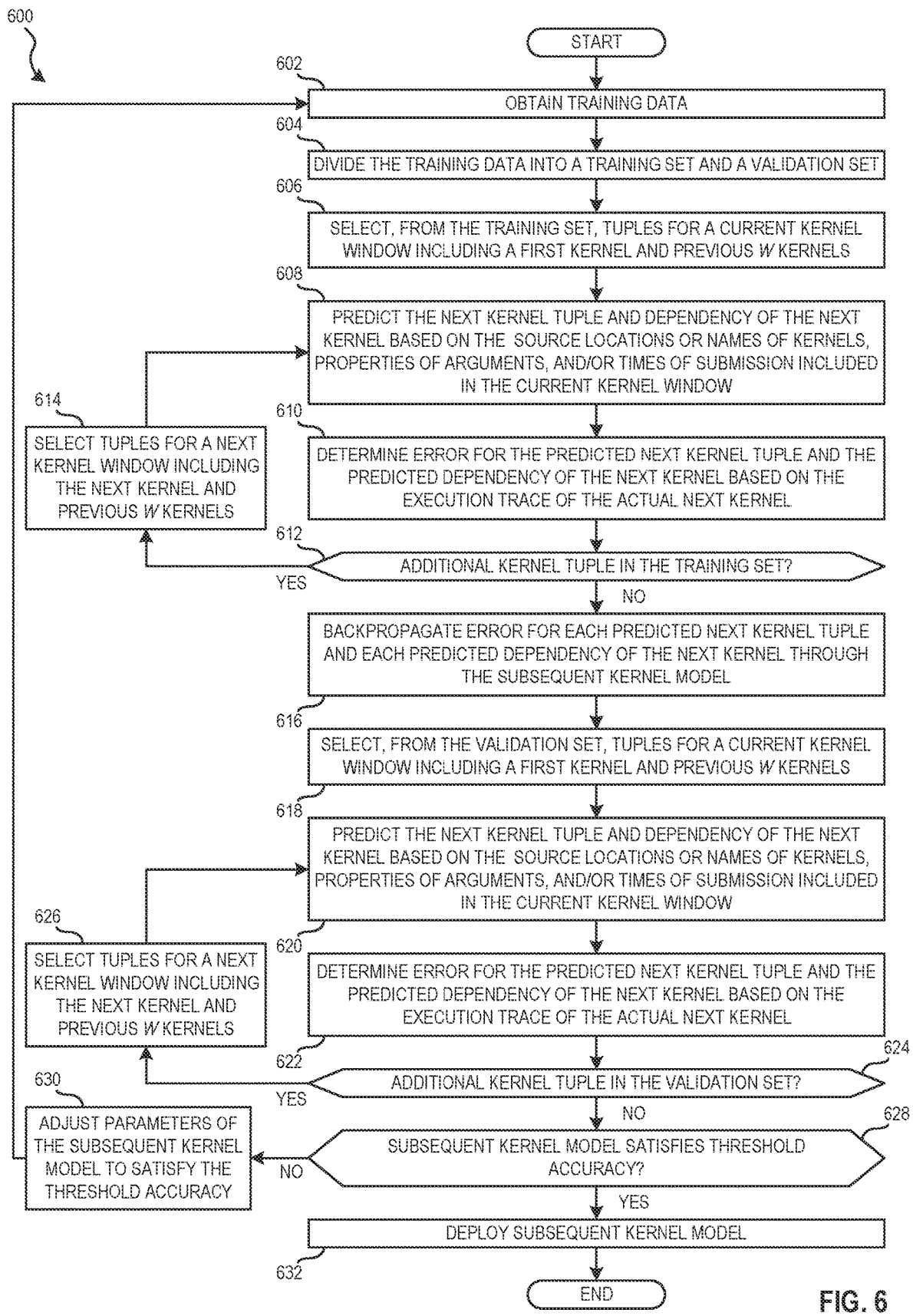
FIG. 6 is a flowchart representative of example machine readable instructions and/or example operations that may be executed and/or instantiated by processor circuitry to implement the training circuitry of FIGS. 1 and/or 2 to train a subsequent kernel model.
Figure 8:
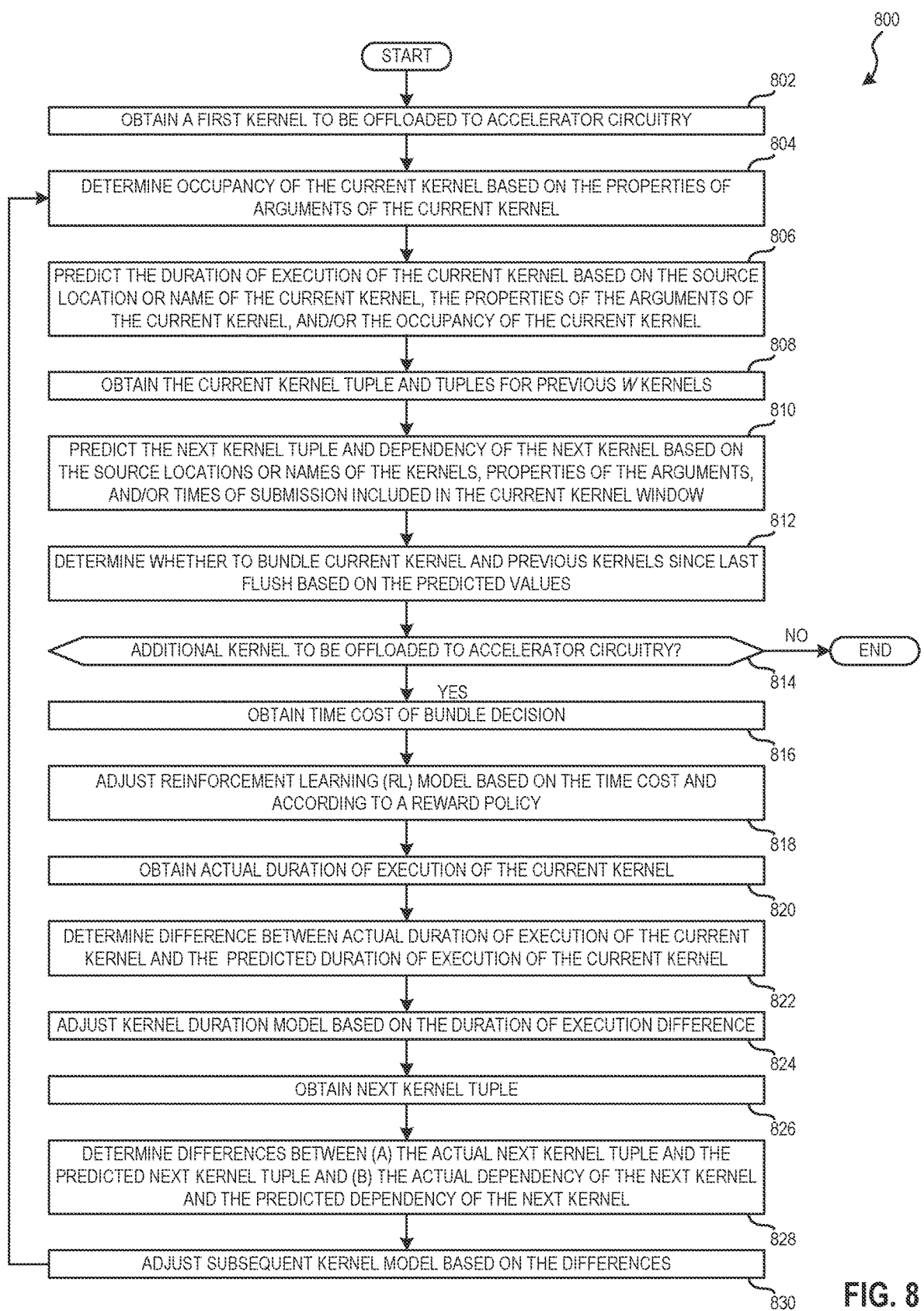
FIG. 8 is a flowchart representative of example machine readable instructions and/or example operations that may be executed and/or instantiated by processor circuitry to implement the model execution circuitry of FIGS. 1 and/or 3 to generate command lists to be offloaded to accelerator circuitry.

Flowcharts representative of example hardware logic circuitry, machine readable instructions, hardware implemented state machines, and/or any combination thereof for implementing the training circuitry 108 of FIGS. 1 and/or 2 are shown in FIGS. 6 and/or 7. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. A flowchart representative of example hardware logic circuitry, machine readable instructions, hardware implemented state machines, and/or any combination thereof for implementing the model execution circuitry 110 of FIGS. 1 and/or 3 are shown in FIG. 8. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and/or 7 many other methods of implementing the example training circuitry 108 may alternatively be used. Additionally, although the example program is described with reference to the flowchart illustrated in FIG. 8 many other methods of implementing the example model execution circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 6, 7, and/or 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to implement the training circuitry 108 of FIGS. 1 and/or 2 to train a subsequent kernel model. The machine readable instructions and/or the operations 600 of FIG. 6 begin at block 602, at which the interfacing circuitry 202 obtains training data. At block 604, the interfacing circuitry 202 divides (e.g., splits, groups, etc.) the training data (e.g., the execution traces) into a training set and a validation set.

In the illustrated example of FIG. 6, at block 606, the subsequent kernel model circuitry 204 selects, from the training set, tuples for a current kernel window including a first kernel and the previous w kernels. At block 608, the subsequent kernel model circuitry 204 predicts the next kernel tuple and a dependency of the next kernel based on the source locations or names of the kernels, properties of the arguments, and/or times of submission of the kernels included in the current kernel window.

In the example of FIG. 6, at block 610, the model validation circuitry 206 determines a first error for a predicted next kernel tuple and a second error for a predicted dependency of the next kernel in the training set based on the execution trace of the actual next kernel. At block 612, the subsequent kernel model circuitry 204 determines whether there is an additional kernel tuple in the training set. In response to the subsequent kernel model circuitry 204 determining that there is an additional kernel tuple in the training set (block 612: YES), the machine readable instructions and/or the operations 600 proceed to block 614. At block 614, the subsequent kernel model circuitry 204 selects tuples for next kernel window including the next kernel and the previous w kernels (e.g., (e.g., $(S_{k+1-w}, A_{k+1-w}, T_{k+1-w})$).

In the illustrated example of FIG. 6, in response to the subsequent kernel model circuitry 204 determining that there are no additional tuples in the training set (block 612: NO), the machine readable instructions and/or the operations 600 proceed to block 616. At block 616, the model validation circuitry 206 backpropagates the error for the predicted next kernel tuples and the predicted dependencies of the next kernel associated with the training set through the subsequent kernel model. At block 618, the subsequent kernel model circuitry 204 selects, from the validation set, tuples for a current kernel window including a first kernel and the previous w kernels. At block 620, the subsequent kernel model circuitry 204 predicts the next kernel tuple and a dependency of the next kernel based on the source locations or names of the kernels, properties of the arguments, and times of submission of the kernels included in the current kernel window.

In the example of FIG. 6, at block 622, the model validation circuitry 206 determines a first error for a predicted next kernel tuple and a second error for a predicted dependency of the next kernel in the validation set based on the execution trace of the actual next kernel. At block 624, the subsequent kernel model circuitry 204 determines whether there is an additional kernel tuple in the validation set. In response to the subsequent kernel model circuitry 204 determining that there is an additional kernel tuple in the validation set (block 624: YES), the machine readable instructions and/or the operations 600 proceed to block 626. At block 626, the subsequent kernel model circuitry 204 selects tuples for next kernel window including the next kernel and the previous w kernels (e.g., (e.g., ($S_{k+1-w}$, $A_{k+1-w}$, $T_{k+1-w}$)).

In the illustrated example of FIG. 6, in response to the subsequent kernel model circuitry 204 determining that there are no additional tuples in the validation set (block 624: NO), the machine readable instructions and/or the operations 600 proceed to block 628. At block 628, the model validation circuitry 206 determines whether the subsequent kernel model satisfies a threshold accuracy of the predicted next kernel tuple and the predicted dependency of the next kernel. For example, the model validation circuitry 206 determines whether the subsequent kernel model satisfies a threshold accuracy of the predicted next kernel tuple based on the first error for the predicted next kernel tuple. Additionally, for example, the model validation circuitry 206 determines whether the subsequent kernel model satisfies a threshold of accuracy of the predicted dependency of the next kernel based on the second error for the predicted dependency of the next kernel. In response to the model validation circuitry 206 determining that the subsequent kernel model does not satisfy the threshold accuracy of the predicted next kernel tuple and the predicted dependency of the next kernel (block 628: NO), the machine readable instructions and/or the operations 600 proceed to block 630. At block 630, the model validation circuitry 206 adjusts one or more parameters of the subsequent kernel model to satisfy the threshold accuracy. For example, for the subsequent kernel model, the model validation circuitry 206 adjusts one or more hyperparameters associated with the number of layers, the size of layers, the learning rate, directionality, dropout rate, normalization layers, and/or the direction (e.g., forward and/or backward) of propagation of information through the subsequent kernel model based on a heuristic to meet the threshold accuracy.

In the illustrated example of FIG. 6, in response to the model validation circuitry 206 determining that the subsequent kernel model satisfies the threshold accuracy of the predicted next kernel tuple and the predicted dependency of the next kernel (block 628: YES), the machine readable instructions and/or the operations 600 proceed to block 632. At block 632, the model validation circuitry 206 deploys the subsequent kernel model. The machine readable instructions and/or the operations 600 subsequently terminate.

Figure 7:
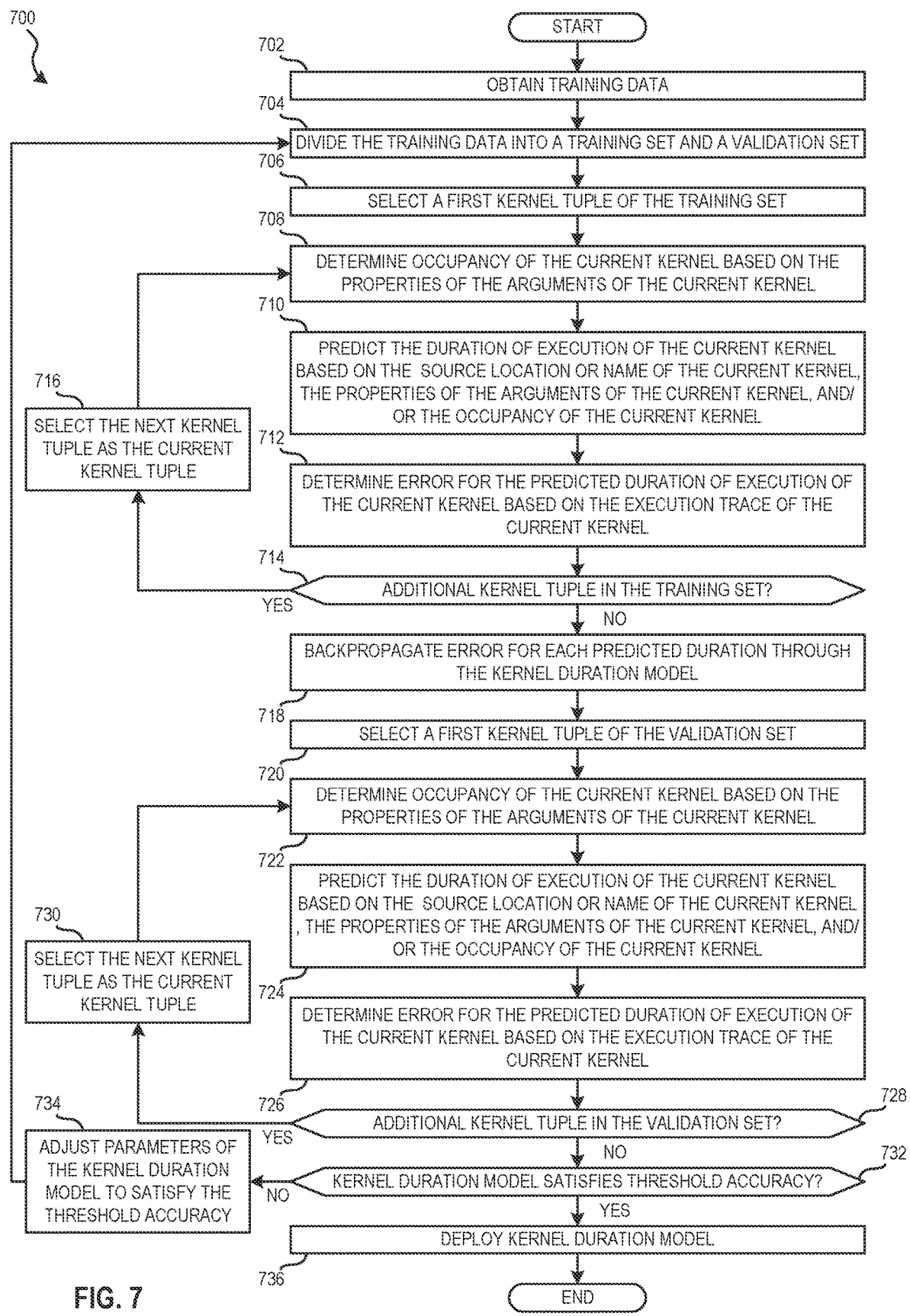
FIG. 7 is a flowchart representative of example machine readable instructions and/or example operations that may be executed and/or instantiated by processor circuitry to implement the training circuitry of FIGS. 1 and/or 2 to train a kernel duration model.

FIG. 7 is a flowchart representative of example machine readable instructions and/or example operations 700 that may be executed and/or instantiated by processor circuitry to implement the training circuitry 108 of FIGS. 1 and/or 2 to train a kernel duration model. The machine readable instructions and/or the operations 700 of FIG. 7 begin at block 702, at which the interface circuitry 202 obtains training data. At block 704, the interfacing circuitry 202 divides (e.g., splits, groups, etc.) the training data (e.g., the execution traces) into a training set and a validation set.

In the illustrated example of FIG. 7, at block 706, the kernel occupancy determination circuitry 208 selects a first kernel of the training set. At block 708, the kernel occupancy determination circuitry 208 determines an occupancy of the selected kernel based on the properties of the arguments of the selected kernel. At block 710, the kernel duration model circuitry 210 predicts the duration of execution of the current kernel based on the source location or name of the current kernel, the properties of the arguments of the current kernel, and/or the occupancy of the current kernel. At block 712, the model validation circuitry 206 determines an error for a predicted duration of execution of the current kernel in the training set based on the execution trace of the current kernel.

In the illustrated example of FIG. 7, at block 714, the kernel occupancy determination circuitry 208 determines whether there is an additional kernel tuple in the training set. In response to the kernel occupancy determination circuitry 208 determining that there is an additional kernel tuple in the training set (block 714: YES), the machine readable instructions and/or the operations 700 proceed to block 716. At block 716, the kernel occupancy determination circuitry 208 selects the next tuple.

In the illustrated example of FIG. 7, in response to the kernel occupancy determination circuitry 208 determining that there are no additional tuples in the training set (block 714: NO), the machine readable instructions and/or the operations 700 proceed to block 718. In the example of FIG. 7, at block 718, the model validation circuitry 206 back-propagates the error for predicted duration of execution of each kernel through the kernel duration model. At block 720, the kernel occupancy determination circuitry 208 selects a first kernel of the validation set.

In the illustrated example of FIG. 7, at block 722, the kernel occupancy determination circuitry 208 determines an occupancy of the selected kernel based on the properties of the arguments of the selected kernel. At block 724, the kernel duration model circuitry 210 predicts the duration of execution of the current kernel based on the source location, the name of the current kernel, the properties of the arguments of the current kernel, and/or the occupancy of the current kernel. At block 726, the model validation circuitry 206 determines an error for a predicted duration of execution of the current kernel in the validation set based on the execution trace of the current kernel.

In the illustrated example of FIG. 7, at block 728, the kernel occupancy determination circuitry 208 determines whether there is an additional kernel tuple in the validation set. In response to the kernel occupancy determination circuitry 208 determining that there is an additional kernel tuple in the validation set (block 728: YES), the machine readable instructions and/or the operations 700 proceed to block 730. At block 730, the kernel occupancy determination circuitry 208 selects the next tuple.

In the illustrated example of FIG. 7, in response to the kernel occupancy determination circuitry 208 determining that there are no additional tuples in the validation set (block 728: NO), the machine readable instructions and/or the operations 700 proceed to block 732. In the example of FIG. 7, at block 732, the model validation circuitry 206 determines whether the kernel duration model satisfies a threshold accuracy of the predicted duration of execution of each kernel in the validation set. For example, the model validation circuitry 206 determines whether the kernel duration model satisfies a threshold accuracy of the predicted duration of a kernel based on the error for the predicted duration of execution of the kernels in the validation set. In response to the model validation circuitry 206 determining that the kernel duration model does not satisfy the threshold accuracy of the predicted duration of execution of each kernel in the validation set (block 732: NO), the machine readable instructions and/or the operations 700 proceed to block 734.

In the illustrated example of FIG. 7, at block 734, the model validation circuitry 206 adjusts one or more parameters of the kernel duration model to satisfy the threshold accuracy. For example, for the kernel duration model, the model validation circuitry 206 adjusts one or more hyperparameters associated with the number of layers, the size of layers, the learning rate, directionality, dropout rate, and/or normalization layers based on a heuristic to meet the threshold accuracy. In response to the model validation circuitry 206 determining that the kernel duration model satisfies the threshold accuracy of the predicted duration of execution of each kernel in the validation set (block 732: YES), the machine readable instructions and/or the operations 700 proceed to block 726. At block 736, the model validation circuitry 206 deploys the kernel duration model. After block 736, the machine readable instructions and/or the operations 700 terminate.

FIG. 8 is a flowchart representative of example machine readable instructions and/or example operations 800 that may be executed and/or instantiated by processor circuitry to implement the central processor unit of FIGS. 1 and/or 3 to generate command lists to be offloaded to accelerator circuitry. The machine readable instructions and/or the operations 800 of FIG. 8 begin at block 802, at which the offload control circuitry 302 obtains kernels that a first kernel to be offloaded to the accelerator circuitry 112. At block 804, the kernel occupancy determination circuitry 304 determines an occupancy of the first kernel based on the properties of the arguments of the first kernel.

In the illustrated example of FIG. 8, at block 806, the kernel duration model circuitry 306 predicts the duration of execution of the first kernel based on the source location or name of the first kernel, the properties of the arguments of the first kernel, and the occupancy of the first kernel. At block 808, the subsequent kernel model circuitry 308 obtains tuples for the current kernel tuple and tuples for the previous w kernels. At block 810, the subsequent kernel model circuitry 308 predicts the next kernel tuple and a dependency of the next kernel based on the source locations or names of the kernels, properties of the arguments, and times of submission of the kernels included in the current kernel window.

In the example of FIG. 8, at block 812, the RL model circuitry 310 determines, based on the predicted duration of execution of the first kernel, the predicted tuple of the next kernel, and the predicted dependency of the next kernel, whether to bundle the first kernel and previous kernels received since the last flush call. At block 814, the offload control circuitry 302 determines whether there is an additional kernel to be offloaded to the accelerator circuitry 112. In response to the offload control circuitry 302 determining that there is not an additional kernel to be offloaded (block 814: NO), the machine readable instructions and/or the operations 800 terminate.

In the example of FIG. 8, in response to the offload control circuitry 302 determining that there is an additional kernel to be offloaded (block 814: YES), the machine readable instructions and/or the operations 800 proceed to block 816. At block 816, the RL model circuitry 310 obtains a negative time cost associated with the decision of whether to bundle the first kernel or wait for additional kernels. At block 818, based on the negative time cost, the RL model circuitry 310 adjusts one or more parameters of the RL model according to a reward policy of the RL model.

In the illustrated example of FIG. 8, at block 820, after a first kernel completes executing on the accelerator circuitry 112, the kernel duration model circuitry 306 obtains the actual duration of execution of the first kernel. At block 822, the kernel duration model circuitry 306 determines a difference between the actual duration of execution of the first kernel and the predicted duration of execution of the first kernel. At block 824, based on the duration difference, the kernel duration model circuitry 306 adjusts one or more parameters of the kernel duration model.

In the illustrated example of FIG. 8, at block 826, the offload control circuitry 302 obtains the next kernel tuple. At block 828, the subsequent kernel model circuitry 308 determines a difference between the actual next kernel tuple and the predicted next kernel tuple as well as a difference between the actual dependency of the next kernel and the predicted dependency of the next kernel. At block 830, based on the differences, the subsequent kernel model circuitry 308 adjusts one or more parameters of the subsequent kernel model. After block 830, the machine readable instructions and/or the operations 800 return to block 804.

Figure 9:
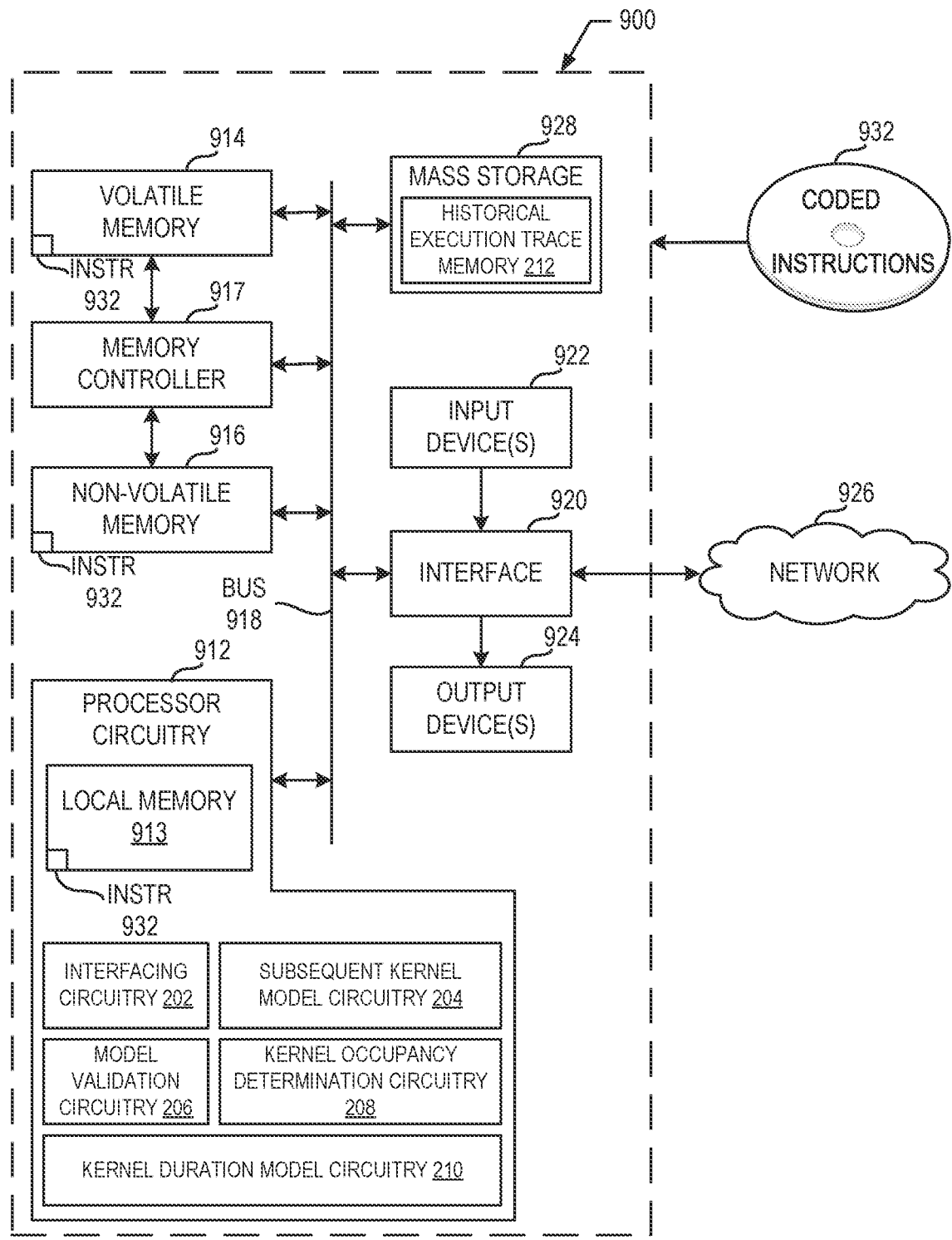
FIG. 9 is a block diagram of an example processing platform including processor circuitry structured to execute the example machine readable instructions and/or the example operations of FIGS. 6 and/or 7 to implement the training circuitry of FIGS. 1 and/or 2.

FIG. 9 is a block diagram of an example processor platform 900 structured to execute and/or instantiate the machine readable instructions and/or the operations 600 of FIG. 6 and/or the machine readable instructions and/or the operations 700 of FIG. 7 to implement the training circuitry 108 of FIGS. 1 and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example interfacing circuitry 202, the example subsequent kernel model circuitry 204, the example model validation circuitry 206, the example kernel occupancy determination circuitry 208, and/or the example kernel duration model circuitry 210.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 928 implement the example historical execution trace memory 212.

The machine executable instructions 932, which may be implemented by the machine readable instructions of FIGS. 6 and/or 7, may be stored in the mass storage device 928, in the volatile memory 914, in the non-volatile memory 916, and/or on a removable non-transitory computer readable storage medium such as a CD or DVD.

Figure 10:
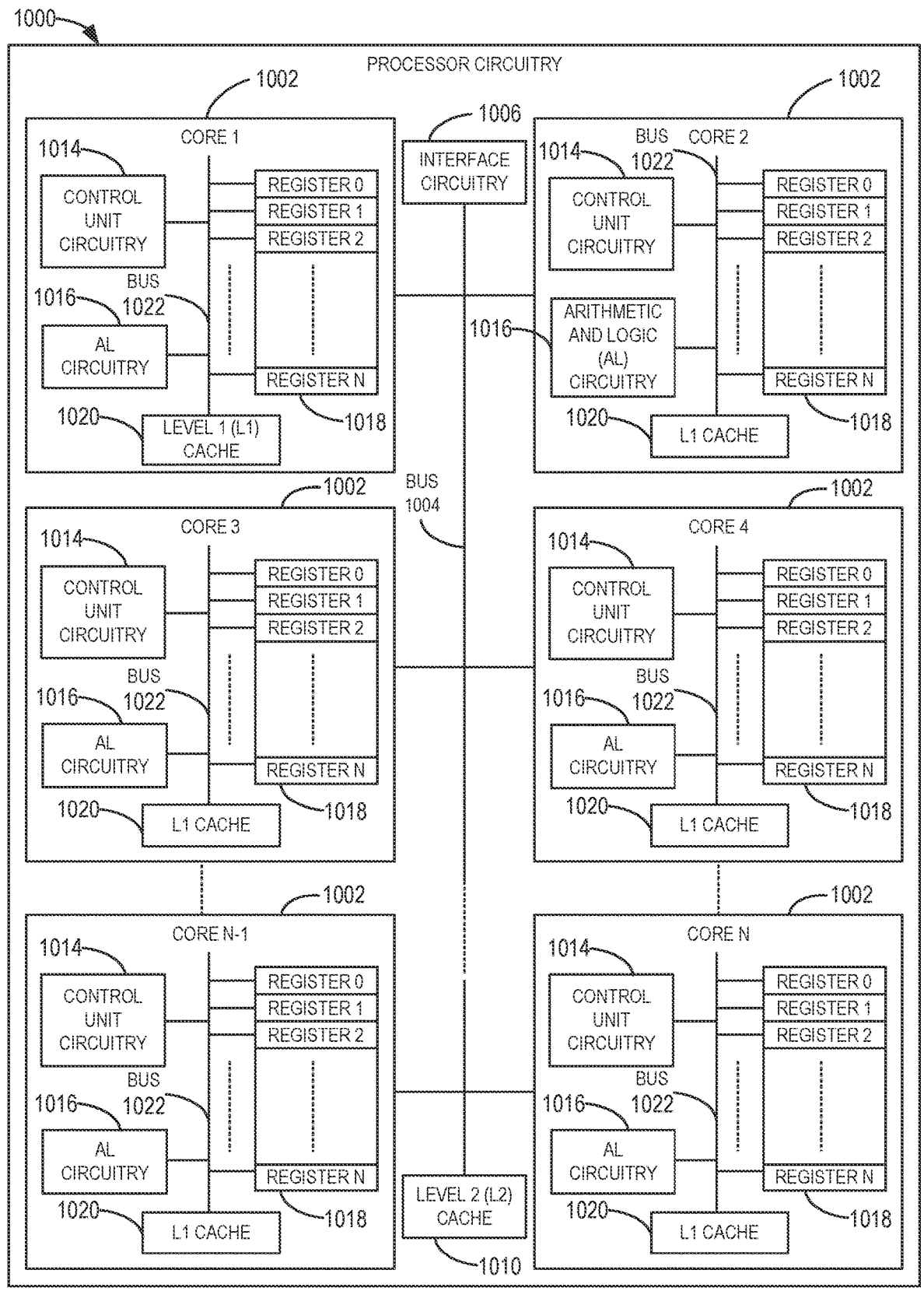
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor circuitry 1000. The general purpose microprocessor circuitry 1000 executes some or all of the machine readable instructions of the flowcharts of FIGS. 6 and/or 7 to effectively instantiate the circuitry of FIG. 2 as logic circuits to perform the operations corresponding to those machine readable instructions (e.g., operations corresponding to instructions). In some such examples, the circuitry of FIG. 2 is instantiated by the hardware circuits of the microprocessor circuitry 1000 in combination with the instructions. For example, the microprocessor circuitry 1000 may implement multi-core hardware circuitry such as a CPU, a DSP, a GPU, an XPU, etc. Although it may include any number of example cores 1002 (e.g., 1 core), the microprocessor circuitry 1000 of this example is a multi-core semiconductor device including N cores. The cores 1002 of the microprocessor circuitry 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 6 and/or 7.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor circuitry 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an arithmetic logic unit (ALU), arithmetic and logic circuitry, etc.) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 (sometimes referred to as control circuitry) includes semiconductor-based circuits structured to control data movement (e.g., coordinate data movement) within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor circuitry 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor circuitry 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
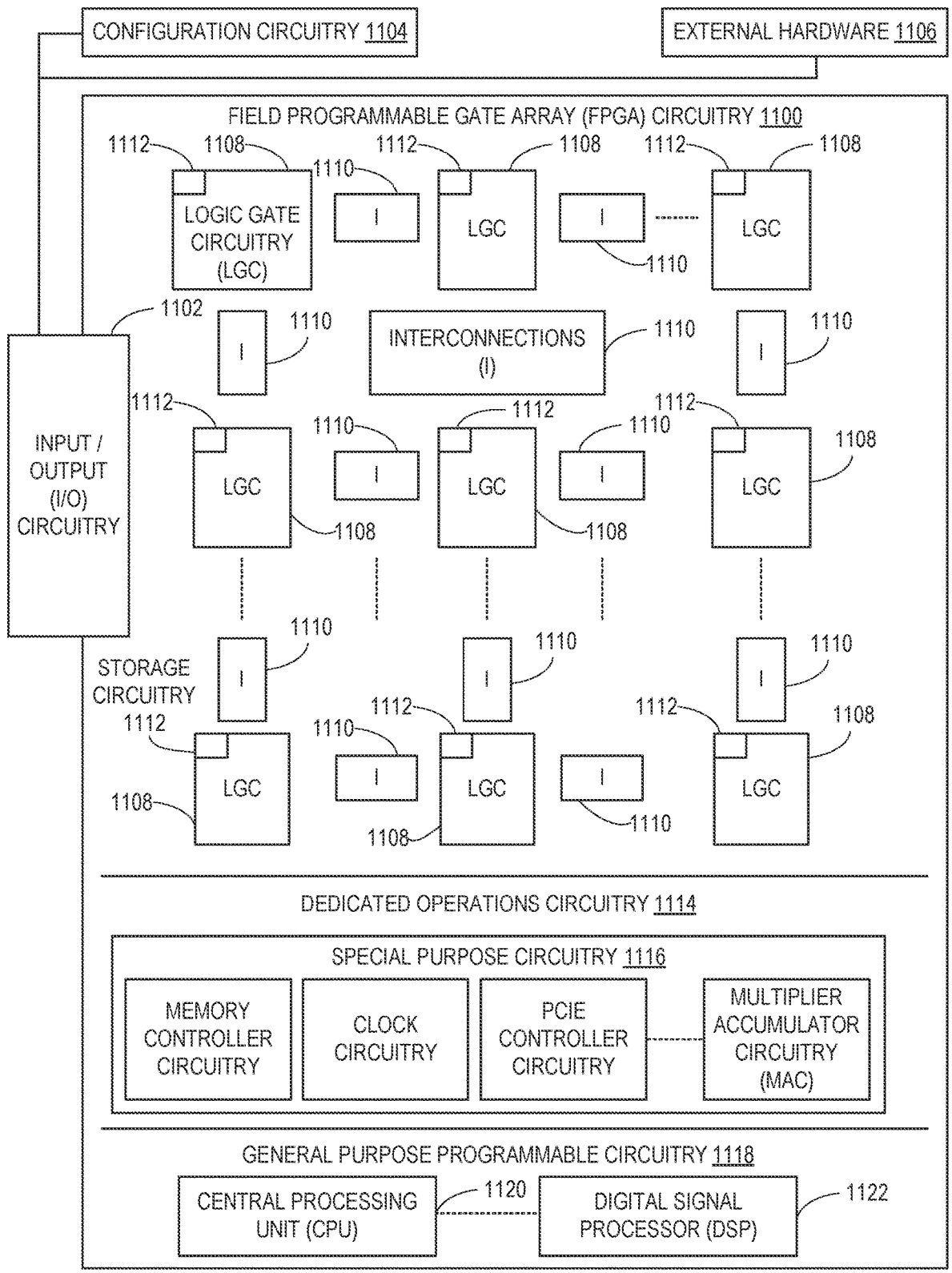
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor circuitry 1000 of FIG. 10 executing corresponding machine readable instructions. However, after configured, the FPGA circuitry 1100 instantiates the machine readable instructions in hardware and, thus, can often execute the operations faster than they could be performed by a general purpose microprocessor executing the corresponding software.

More specifically, in contrast to the microprocessor circuitry 1000 of FIG. 10 described above (which is a general purpose device that may be programmed to execute some or all of the machine readable instructions represented by the flowcharts of FIGS. 6 and/or 7 but whose interconnections and logic circuitry are fixed after fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 6 and/or 7. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 6 and/or 7. As such, the FPGA circuitry 1100 may be structured to effectively instantiate some or all of the machine readable instructions of the flowcharts of FIGS. 6 and/or 7 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 6 and/or 7 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor circuitry 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 6 and/or 7 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor circuitry 1000 of FIG. 10 and the example FPGA circuitry 1100 of FIG. 11. In some such hybrid examples, a first portion of the machine readable instructions represented by the flowcharts of FIGS. 6 and/or 7 may be executed by one or more of the cores 1002 of FIG. 10, a second portion of the machine readable instructions represented by the flowcharts of FIGS. 6 and/or 7 may be executed by the FPGA circuitry 1100 of FIG. 11, and/or a third portion of the machine readable instructions represented by the flowcharts of FIGS. 6 and/or 7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the microprocessor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
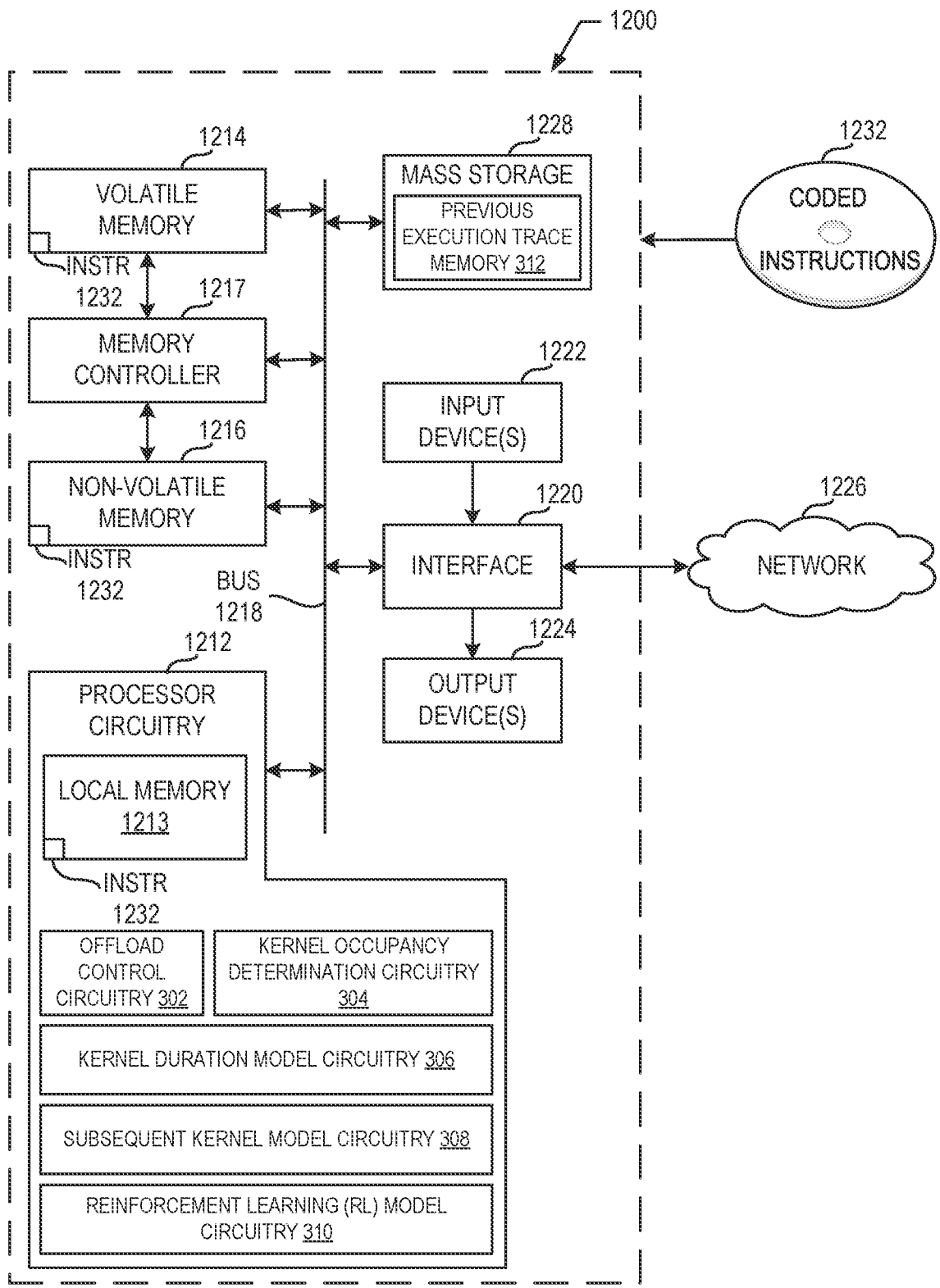
FIG. 12 is a block diagram of an example processing platform including processor circuitry structured to execute the example machine readable instructions and/or the example operations of FIG. 8 to implement the model execution circuitry of FIGS. 1 and/or 3.

FIG. 12 is a block diagram of an example processor platform 1200 structured to execute and/or instantiate the machine readable instructions and/or the operations 800 of FIG. 8 to implement the model execution circuitry 110 of FIGS. 1 and/or 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example offload control circuitry 302, the example kernel occupancy determination circuitry 304, the example kernel duration model circuitry 306, the example subsequent kernel model circuitry 308, and/or the example RL model circuitry 310.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAIVIBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage device 1228 implement the example previous execution trace memory 312.

The machine executable instructions 1232, which may be implemented by the machine readable instructions of FIG. 8, may be stored in the mass storage device 1228, in the volatile memory 1214, in the non-volatile memory 1216, and/or on a removable non-transitory computer readable storage medium such as a CD or DVD.

Figure 13:
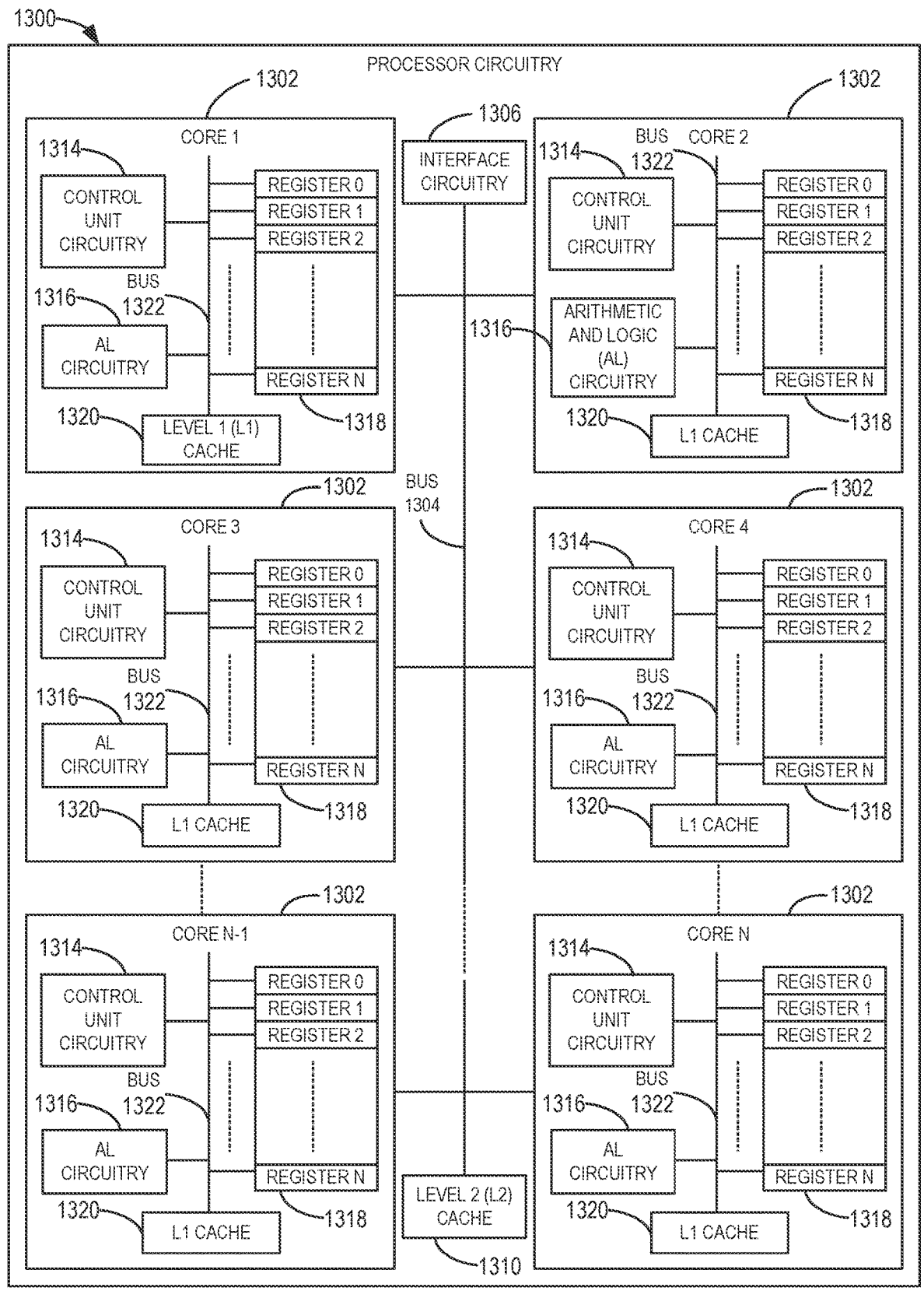
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a general purpose microprocessor circuitry 1300. The general purpose microprocessor circuitry 1300 executes some or all of the machine readable instructions of the flowchart of FIG. 8 to effectively instantiate the circuitry of FIG. 3 as logic circuits to perform the operations corresponding to those machine readable instructions (e.g., operations corresponding to instructions). In some such examples, the circuitry of FIG. 3 is instantiated by the hardware circuits of the microprocessor circuitry 1300 in combination with the instructions. For example, the microprocessor circuitry 1300 may implement multi-core hardware circuitry such as a CPU, a DSP, a GPU, an XPU, etc. Although it may include any number of example cores 1302 (e.g., 1 core), the microprocessor circuitry 1300 of this example is a multi-core semiconductor device including N cores. The cores 1302 of the microprocessor circuitry 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowchart of FIG. 8.

The cores 1302 may communicate by a first example bus 1004. In some examples, the first bus 1304 may implement a communication bus to effectuate communication associated with one(s) of the cores 1302. For example, the first bus 1304 may implement at least one of an Inter-Integrated Circuit (I2C) bus, a Serial Peripheral Interface (SPI) bus, a PCI bus, or a PCIe bus. Additionally or alternatively, the first bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor circuitry 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an arithmetic logic unit (ALU), arithmetic and logic circuitry, etc.) 1316, a plurality of registers 1318, the L1 cache 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 (sometimes referred to as control circuitry) includes semiconductor-based circuits structured to control data movement (e.g., coordinate data movement) within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may implement at least one of an I2C bus, a SPI bus, a PCI bus, or a PCIe bus Each core 1302 and/or, more generally, the microprocessor circuitry 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor circuitry 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
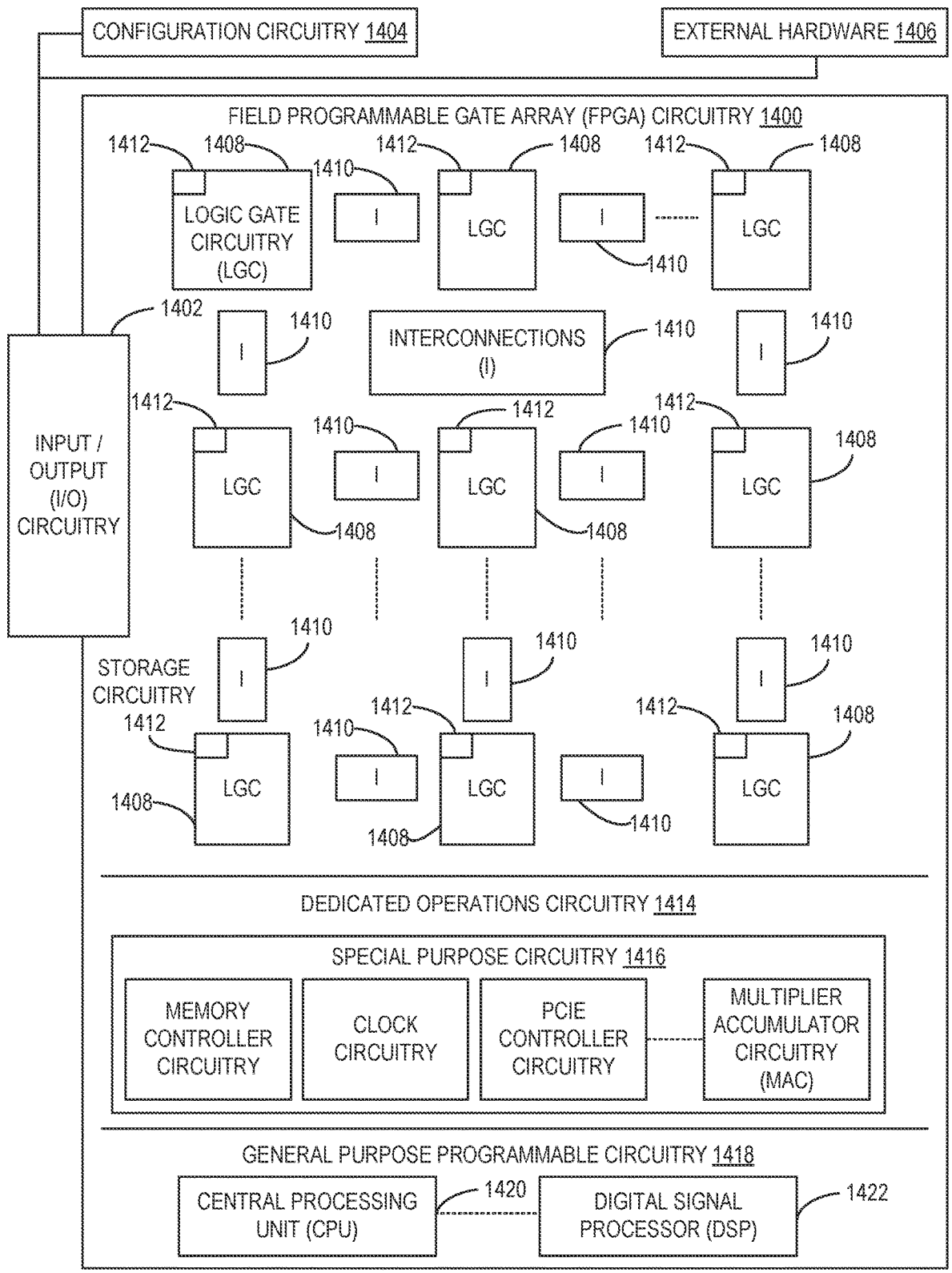
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. The FPGA circuitry 1400 can be used, for example, to perform operations that could otherwise be performed by the example microprocessor circuitry 1300 of FIG. 13 executing corresponding machine readable instructions. However, after configured, the FPGA circuitry 1400 instantiates the machine readable instructions in hardware and, thus, can often execute the operations faster than they could be performed by a general purpose microprocessor executing the corresponding software.

More specifically, in contrast to the microprocessor circuitry 1300 of FIG. 13 described above (which is a general purpose device that may be programmed to execute some or all of the machine readable instructions represented by the flowchart of FIG. 8 but whose interconnections and logic circuitry are fixed after fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowchart of FIG. 8. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1400 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 8 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor circuitry 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIG. 8 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor circuitry 1300 of FIG. 13 and the example FPGA circuitry 1400 of FIG. 14. In some such hybrid examples, a first portion of the machine readable instructions represented by the flowchart of FIG. 8 may be executed by one or more of the cores 1302 of FIG. 13, a second portion of the machine readable instructions represented by the flowchart of FIG. 8 may be executed by the FPGA circuitry 1400 of FIG. 14, and/or a third portion of the machine readable instructions represented by the flowchart of FIG. 8 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 1212 of FIG. 12 may be in one or more packages. For example, the microprocessor circuitry 1300 of FIG. 13 and/or the FPGA circuitry 1400 of FIG. 14 may be in one or more packages. In some examples, an XPU may be implemented by the processor circuitry 1212 of FIG. 12, which may be in one or more packages. For example, the XPU may include a CPU in one package, a DSP in another package, a GPU in yet another package, and an FPGA in still yet another package.

Figure 15:
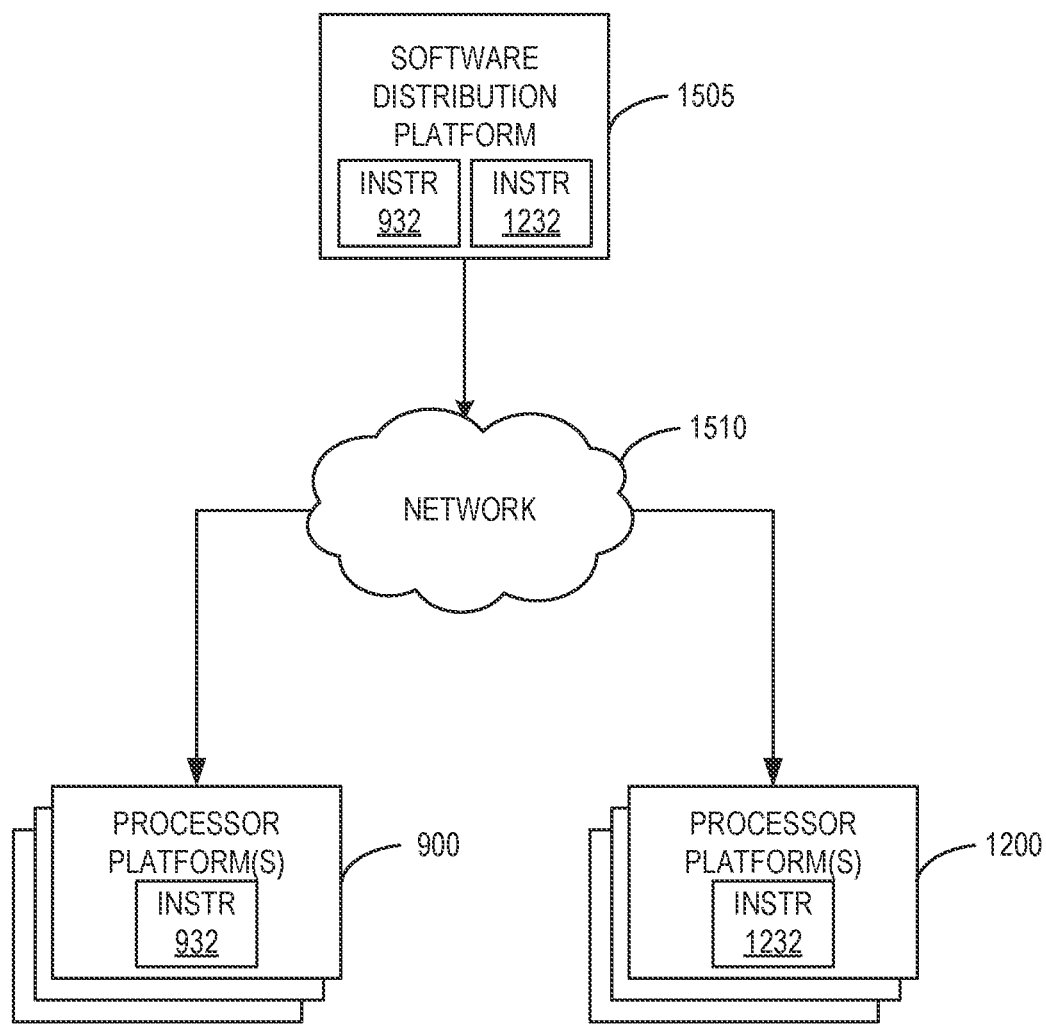
FIG. 15 is a block diagram of an example software distribution platform (e.g., one or more servers) to distribute software (e.g., software corresponding to the example machine readable instructions of FIGS. 6, 7, and/or 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 932 of FIG. 9 and/or the machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 932 of FIG. 9 and/or the example machine readable instructions 1232 of FIG. 12. The third parties may be consumers, users, retailers, OEMs, etc., who purchase and/or license the software for use and/or re-sale and/or sub-licensing.

In the illustrated example of FIG. 15, the software distribution platform 1505 includes one or more servers and one or more storage devices. The storage devices store the machine readable instructions 932, which may correspond to the example machine readable instructions and/or example operations 600 of FIG. 6 and/or the example machine readable instructions and/or example operations 700 of FIG. 7, as described above. The storage devices also store the machine readable instructions 1232, which may correspond to the example machine readable instructions and/or example operations 800 of FIG. 8. The one or more servers of the example software distribution platform 1505 are in communication with a network 1510, which may correspond to any one or more of the Internet and/or the example network 104 described above.

In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 and/or the machine readable instructions 1232 from the software distribution platform 1505. For example, the software, which may correspond to the example machine readable instructions and/or example operations 600 of FIG. 6 and/or the example machine readable instructions and/or example operations 700 of FIG. 7, may be downloaded to the example processor platform 900, which is to execute the machine readable instructions 932 to implement the training circuitry 108. Additionally, for example, the software, which may correspond to the example machine readable instructions and/or example operations 800 of FIG. 8, may be downloaded to the example processor platform 1200, which is to execute the machine readable instructions 1232 to implement the model execution circuitry 110. In some example, one or more servers of the software distribution platform 1505 periodically offer, transmit, and/or force updates to the software (e.g., the example machine readable instructions 932 of FIG. 9 and/or the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that generate command lists to be offloaded to accelerator circuitry. Examples disclosed herein include a learned kernel scheduling heuristic for generating command lists for accelerator circuitry (e.g., GPU) offloading. Examples disclosed herein create a scheduling heuristic that is more optimal than existing naïve brute force techniques for creating command lists of offloaded kernels for an execution queue on accelerator circuitry (e.g., GPU). Example systems, methods, apparatus, and articles of manufacture disclosed herein improve accelerator circuitry (e.g., GPU) utilization and reduced total runtime in heterogeneous systems. Disclosed systems, methods, apparatus, and articles of manufacture improve the efficiency of using a computing device by reducing the computational cost of creating command lists. Further, examples disclosed herein improve underutilization of heterogeneous hardware compute resources. Accordingly, examples disclosed herein reduce runtime and improve performance of end-to-end applications executing on heterogeneous systems. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate command lists to be offloaded to accelerator circuitry are disclosed herein. Further examples and combinations thereof include the following:

Example 1 includes an apparatus to generate command lists to be offloaded to accelerator circuitry, the apparatus comprising offload control circuitry to obtain a first tuple of a first kernel to be offloaded to the accelerator circuitry, and processor circuitry including one or more of at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus, Field Programmable Gate Array (FPGA) circuitry, the FPGA circuitry including first logic gate circuitry, a plurality of configurable interconnections, and storage circuitry, the first logic gate circuitry and interconnections to perform one or more second operations, the storage circuitry to store a second result of the one or more second operations, or Application Specific Integrated Circuitry (ASIC) including second logic gate circuitry to perform one or more third operations, the processor circuitry to perform at least one of the first operations, the second operations, or the third operations to instantiate kernel duration model circuitry to predict a duration of execution of the first kernel based on at least one of a first source location of the first kernel, a first name of the first kernel, a first property of a first argument of the first kernel, or an occupancy of the first kernel, subsequent kernel model circuitry to predict a second tuple of a second kernel and a dependency of the second kernel based on at least one of a second source location of a previous kernel, a second name of the previous kernel, a second property of a second argument of the previous kernel, or a time of submission of the previous kernel, and reinforcement learning model circuitry to determine whether to bundle the first kernel into a command list based on at least one of (a) the duration of execution of the first kernel, (b) the second tuple of the second kernel, or (c) the dependency of the second kernel.

Example 2 includes the apparatus of example 1, wherein the processor circuitry is to perform at least one of the first operations, the second operations, or the third operations to instantiate kernel occupancy determination circuitry to determine the occupancy of the first kernel based on the first property of the first argument of the first kernel.

Example 3 includes the apparatus of any of examples 1 or 2, wherein the time of submission of the previous kernel is a first time of submission, and the first tuple includes (a) the first property of the first argument of the first kernel, (b) a second time of submission of the first kernel, and (c) at least one of the first source location of the first kernel or the first name of the first kernel.

Example 4 includes the apparatus of any of examples 1, 2, or 3, wherein the processor circuitry is to perform at least one of the first operations, the second operations, or the third operations to instantiate the reinforcement learning (RL) model circuitry to adjust the RL model based on a time cost associated with bundling of the first kernel into the command list.

Example 5 includes the apparatus of any of examples 1, 2, 3, or 4, wherein the processor circuitry to perform at least one of the first operations, the second operations, or the third operations to instantiate the kernel duration model circuitry to determine a difference between an actual duration of execution of the first kernel and the predicted duration of execution of the first kernel from the kernel duration model circuitry, and adjust the kernel duration model based on the difference.

Example 6 includes the apparatus of any of examples 1, 2, 3, 4, or 5, wherein the processor circuitry to perform at least one of the first operations, the second operations, or the third operations to instantiate the subsequent kernel model circuitry to determine a first difference between an actual tuple of the second kernel and the predicted second tuple of the second kernel from the subsequent kernel model circuitry, determine a second difference between an actual dependency of the second kernel and the predicted dependency of the second kernel from the subsequent kernel model circuitry, and adjust the subsequent kernel model based on at least one of the first difference or the second difference.

Example 7 includes the apparatus of any of examples 1, 2, 3, 4, 5, or 6, wherein the GPU is a first GPU, and the accelerator circuitry includes a second GPU.

Example 8 includes a non-transitory computer readable medium comprising machine readable instructions which, when executed, cause processor circuitry to predict, with a kernel duration model, a duration of execution of a first kernel based on at least one of a first source location of the first kernel, a first name of the first kernel, a first property of a first argument of the first kernel, or an occupancy of the first kernel, the first kernel to be offloaded to accelerator circuitry, predict, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel, and determine, with a reinforcement learning model, whether to bundle the first kernel into a command list based on at least one of (a) the duration of execution of the first kernel, (b) the tuple of the second kernel, or (c) the dependency of the second kernel.

Example 9 includes the non-transitory computer readable medium of example 8, wherein the instructions cause the processor circuitry to determine the occupancy of the first kernel based on the first property of the first argument of the first kernel.

Example 10 includes the non-transitory computer readable medium of any of examples 8 or 9, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

Example 11 includes the non-transitory computer readable medium of any of examples 8, 9, or 10, wherein the instructions cause the processor circuitry to adjust the reinforcement learning model based on a time cost associated with bundling of the first kernel into the command list.

Example 12 includes the non-transitory computer readable medium of any of examples 8, 9, 10, or 11, wherein the instructions cause the processor circuitry to determine a difference between an actual duration of execution of the first kernel and the predicted duration of execution of the first kernel, and adjust the kernel duration model based on the difference.

Example 13 includes the non-transitory computer readable medium of any of examples 8, 9, 10, 11, or 12, wherein the instructions cause the processor circuitry to determine a first difference between an actual tuple of the second kernel and the predicted tuple of the second kernel, determine a second difference between an actual dependency of the second kernel and the predicted dependency of the second kernel, and adjust the subsequent kernel model based on at least one of the first difference or the second difference.

Example 14 includes the non-transitory computer readable medium of any of examples 8, 9, 10, 11, 12, or 13, wherein the accelerator circuitry includes a graphics processor unit.

Example 15 includes an apparatus to generate command lists to be offloaded to accelerator circuitry, the apparatus comprising at least one memory, instructions, processor circuitry to execute the instructions to at least predict, with a kernel duration model, a duration of execution of a first kernel based on at least one of a first source location of the first kernel, a first name of the first kernel, a first property of a first argument of the first kernel, or an occupancy of the first kernel, predict, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel, and determine, with a reinforcement learning model, whether to bundle the first kernel into a command list based on at least one of (a) the duration of execution of the first kernel, (b) the tuple of the second kernel, or (c) the dependency of the second kernel.

Example 16 includes the apparatus of example 15, wherein processor circuitry is to determine the occupancy of the first kernel based on the first property of the first argument of the first kernel.

Example 17 includes the apparatus of any of examples 15 or 16, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

Example 18 includes the apparatus of any of examples 15, 16, or 17, wherein the processor circuitry is to adjust the reinforcement learning model based on a time cost associated with bundling of the first kernel into the command list.

Example 19 includes the apparatus of any of examples 15, 16, 17, or 18, wherein the processor circuitry is to determine a difference between an actual duration of execution of the first kernel and the predicted duration of execution of the first kernel, and adjust the kernel duration model based on the difference.

Example 20 includes the apparatus of any of examples 15, 16, 17, 18, or 19, wherein the processor circuitry is to determine a first difference between an actual tuple of the second kernel and the predicted tuple of the second kernel, determine a second difference between an actual dependency of the second kernel and the predicted dependency of the second kernel, and adjust the subsequent kernel model based on at least one of the first difference or the second difference.

Example 21 includes the apparatus of any of examples 15, 16, 17, 18, 19, or 20, wherein the accelerator circuitry includes a graphics processor unit.

Example 22 includes a method for generating command lists to be offloaded to accelerator circuitry, the method comprising predicting, with a kernel duration model, a duration of execution of a first kernel based on at least one of a first source location of the first kernel, a first name of the first kernel, a first property of a first argument of the first kernel, or an occupancy of the first kernel, predicting, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel, and determining, with a reinforcement learning model, whether to bundle the first kernel into a command list based on at least one of (a) the duration of execution of the first kernel, (b) the tuple of the second kernel, or (c) the dependency of the second kernel.

Example 23 includes the method of example 22, further including determining the occupancy of the first kernel based on the first property of the first argument of the first kernel.

Example 24 includes the method of any of examples 22 or 23, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

Example 25 includes the method of any of examples 22, 23, or 24, further including adjusting the reinforcement learning model based on a time cost associated with bundling of the first kernel into the command list.

Example 26 includes the method of any of examples 22, 23, 24, or 25, further including determining a difference between an actual duration of execution of the first kernel and the predicted duration of execution of the first kernel, and adjusting the kernel duration model based on the difference.

Example 27 includes the method of any of examples 22, 23, 24, 25, or 26, further including determining a first difference between an actual tuple of the second kernel and the predicted tuple of the second kernel, determining a second difference between an actual dependency of the second kernel and the predicted dependency of the second kernel, and adjusting the subsequent kernel model based on at least one of the first difference or the second difference.

Example 28 includes the method of any of examples 22, 23, 24, 25, 26, or 27, wherein the accelerator circuitry includes a graphics processor unit.

Example 29 includes an apparatus to generate command lists to be offloaded to accelerator circuitry, the apparatus comprising means for executing a kernel duration model to predict a duration of execution of a first kernel based on at least one of a first source location of the first kernel, a first name of the first kernel, a first property of a first argument of the first kernel, or an occupancy of the first kernel, means for executing a subsequent kernel model to predict a tuple of a second kernel and a dependency of the second kernel based on at least one of a second source location of a previous kernel, a second name of the previous kernel, a second property of a second argument of the previous kernel, or a time of submission of the previous kernel, and means for executing a reinforcement learning model to determine whether to bundle the first kernel into a command list based on at least one of (a) the duration of execution of the first kernel, (b) the tuple of the second kernel, or (c) the dependency of the second kernel.

Example 30 includes the apparatus of example 29, further including means for determining kernel occupancy to determine the occupancy of the first kernel based on the first property of the first argument of the first kernel.

Example 31 includes the apparatus of any of examples 29 or 30, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

Example 32 includes the apparatus of any of examples 29, 30, or 31, wherein means for executing the reinforcement learning (RL) model are to adjust the RL model based on a time cost associated with bundling of the first kernel into the command list.

Example 33 includes the apparatus of any of examples 29, 30, 31, or 32, wherein the means for executing the kernel duration model are to determine a difference between an actual duration of execution of the first kernel and the predicted duration of execution of the first kernel, and adjust the kernel duration model based on the difference.

Example 34 includes the apparatus of any of examples 29, 30, 31, 32, or 33, wherein means for executing the subsequent kernel model are to determine a first difference between an actual tuple of the second kernel and the predicted tuple of the second kernel, determine a second difference between an actual dependency of the second kernel and the predicted dependency of the second kernel, and adjust the subsequent kernel model based on at least one of the first difference or the second difference.

Example 35 includes the apparatus of any of examples 29, 30, 31, 32, 33, or 34, wherein the accelerator circuitry includes a graphics processor unit.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to generate command lists to be offloaded to accelerator circuitry, the apparatus comprising:
    offload control circuitry to obtain a first tuple of a first kernel to be offloaded to the accelerator circuitry; and
    processor circuitry including one or more of:
        at least one of a central processor unit (CPU), a graphics processor unit (GPU), or a digital signal processor (DSP), the at least one of the CPU, the GPU, or the DSP having control circuitry to control data movement within the processor circuitry, arithmetic and logic circuitry to perform one or more first operations corresponding to instructions, and one or more registers to store a first result of the one or more first operations, the instructions in the apparatus;
        Field Programmable Gate Array (FPGA) circuitry, the FPGA circuitry including first logic gate circuitry, a plurality of configurable interconnections, and storage circuitry, the first logic gate circuitry and interconnections to perform one or more second operations, the storage circuitry to store a second result of the one or more second operations; or
        Application Specific Integrated Circuitry (ASIC) including second logic gate circuitry to perform one or more third operations;
    the processor circuitry to perform at least one of the first operations, the second operations, or the third operations to instantiate:
        kernel duration model circuitry to predict a duration of execution of the first kernel based on at least one of a first source location of the first kernel, a first name of the first kernel, a first property of a first argument of the first kernel, or an occupancy of the first kernel;
        subsequent kernel model circuitry to predict a second tuple of a second kernel and a dependency of the second kernel based on at least one of a second source location of a previous kernel, a second name of the previous kernel, a second property of a second argument of the previous kernel, or a time of submission of the previous kernel; and
        reinforcement learning model circuitry to determine whether to bundle the first kernel into a command list based on at least one of (a) the duration of execution of the first kernel, (b) the second tuple of the second kernel, or (c) the dependency of the second kernel.

2. The apparatus of claim 1, wherein the processor circuitry is to perform at least one of the first operations, the second operations, or the third operations to instantiate kernel occupancy determination circuitry to determine the occupancy of the first kernel based on the first property of the first argument of the first kernel.

3. The apparatus of claim 1, wherein the time of submission of the previous kernel is a first time of submission, and the first tuple includes (a) the first property of the first argument of the first kernel, (b) a second time of submission of the first kernel, and (c) at least one of the first source location of the first kernel or the first name of the first kernel.

4. The apparatus of claim 1, wherein the processor circuitry is to perform at least one of the first operations, the second operations, or the third operations to instantiate the reinforcement learning (RL) model circuitry to adjust the RL model based on a time cost associated with bundling of the first kernel into the command list.

5. The apparatus of claim 1, wherein the processor circuitry to perform at least one of the first operations, the second operations, or the third operations to instantiate the kernel duration model circuitry to:
    determine a difference between an actual duration of execution of the first kernel and the predicted duration of execution of the first kernel from the kernel duration model circuitry; and
    adjust the kernel duration model based on the difference.

6. The apparatus of claim 1, wherein the processor circuitry to perform at least one of the first operations, the second operations, or the third operations to instantiate the subsequent kernel model circuitry to:
    determine a first difference between an actual tuple of the second kernel and the predicted second tuple of the second kernel from the subsequent kernel model circuitry;
    determine a second difference between an actual dependency of the second kernel and the predicted dependency of the second kernel from the subsequent kernel model circuitry; and
    adjust the subsequent kernel model based on at least one of the first difference or the second difference.

7. The apparatus of claim 1, wherein the GPU is a first GPU, and the accelerator circuitry includes a second GPU.

8. The apparatus of claim 1, wherein the time of submission of the previous kernel is a first time of submission, and, to predict the second tuple of the second kernel, the subsequent kernel model circuitry is to predict at least one of a third source location of the second kernel, a third name of the second kernel, a third property of a third argument of the second kernel, or a second time of submission of the second kernel.

9. A non-transitory computer readable medium comprising machine readable instructions which, when executed, cause programmable processor circuitry to:
    predict, with a kernel duration model, a duration of execution of a first kernel based on at least one of a first source location of the first kernel, a first name of the first kernel, a first property of a first argument of the first kernel, or an occupancy of the first kernel, the first kernel to be offloaded to accelerator circuitry;
predict, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel; and
determine, with a reinforcement learning model, whether to bundle the first kernel into a command list based on at least one of (a) the duration of execution of the first kernel, (b) the tuple of the second kernel, or (c) the dependency of the second kernel.

10. The non-transitory computer readable medium of claim 9, wherein the instructions cause the programmable processor circuitry to determine the occupancy of the first kernel based on the first property of the first argument of the first kernel.

11. The non-transitory computer readable medium of claim 9, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

12. The non-transitory computer readable medium of claim 9, wherein the instructions cause the programmable circuitry to adjust the reinforcement learning model based on a time cost associated with bundling of the first kernel into the command list.

13. The non-transitory computer readable medium of claim 9, wherein the instructions cause the programmable circuitry to:
determine a difference between an actual duration of execution of the first kernel and the predicted duration of execution of the first kernel; and
adjust the kernel duration model based on the difference.

14. The non-transitory computer readable medium of claim 9, wherein the instructions cause the programmable circuitry to:
determine a first difference between an actual tuple of the second kernel and the predicted tuple of the second kernel;
determine a second difference between an actual dependency of the second kernel and the predicted dependency of the second kernel; and
adjust the subsequent kernel model based on at least one of the first difference or the second difference.

15. The non-transitory computer readable medium of claim 9, wherein the time of submission of the previous kernel is a first time of submission, and to predict the tuple of the second kernel the instructions cause the programmable circuitry to predict at least one of a third source location of the second kernel, a third name of the second kernel, a third property of a third argument of the second kernel, or a second time of submission of the second kernel.

16. An apparatus to generate command lists to be offloaded to accelerator circuitry, the apparatus comprising:
at least one memory;
machine readable instructions;
programmable circuitry to at least one of instantiate or execute the machine readable instructions to:
predict, with a kernel duration model, a duration of execution of a first kernel based on at least one of a first source location of the first kernel, a first name of the first kernel, a first property of a first argument of the first kernel, or an occupancy of the first kernel;
predict, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel; and
determine, with a reinforcement learning model, whether to bundle the first kernel into a command list based on at least one of (a) the duration of execution of the first kernel, (b) the tuple of the second kernel, or (c) the dependency of the second kernel.

17. The apparatus of claim 16, wherein the programmable circuitry is to determine the occupancy of the first kernel based on the first property of the first argument of the first kernel.

18. The apparatus of claim 16, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

19. The apparatus of claim 16, wherein the programmable circuitry is to adjust the reinforcement learning model based on a time cost associated with bundling of the first kernel into the command list.

20. The apparatus of claim 16, wherein the programmable circuitry is to:
determine a difference between an actual duration of execution of the first kernel and the predicted duration of execution of the first kernel; and
adjust the kernel duration model based on the difference.

21. The apparatus of claim 16, wherein the programmable circuitry is to:
determine a first difference between an actual tuple of the second kernel and the predicted tuple of the second kernel;
determine a second difference between an actual dependency of the second kernel and the predicted dependency of the second kernel; and
adjust the subsequent kernel model based on at least one of the first difference or the second difference.

22. The apparatus of claim 16, wherein the time of submission of the previous kernel is a first time of submission, and to predict the tuple of the second kernel the programmable circuitry is to predict at least one of a third source location of the second kernel, a third name of the second kernel, a third property of a third argument of the second kernel, or a second time of submission of the second kernel.

23. A method for generating command lists to be offloaded to accelerator circuitry, the method comprising:
predicting, with a kernel duration model, a duration of execution of a first kernel based on at least one of a first source location of the first kernel, a first name of the first kernel, a first property of a first argument of the first kernel, or an occupancy of the first kernel;
predicting, with a subsequent kernel model, a tuple of a second kernel and a dependency of the second kernel based on at least one of a second source location of a previous kernel, a second name of the previous kernel, a second property of a second argument of the previous kernel, or a time of submission of the previous kernel; and determining, with a reinforcement learning model, whether to bundle the first kernel into a command list based on at least one of (a) the duration of execution of the first kernel, (b) the tuple of the second kernel, or (c) the dependency of the second kernel.

24. The method of claim 23, wherein the tuple of the second kernel is a first tuple, the time of submission of the previous kernel is a first time of submission, and a second tuple of the first kernel includes (a) the first property of the first argument of the first kernel, (b) a second time of submission of the first kernel, and (c) at least one of the first source location of the first kernel or the first name of the first kernel.

25. The method of claim 23, wherein the time of submission of the previous kernel is a first time of submission, the second kernel is a subsequent kernel that is to be offloaded to the accelerator circuitry, and predicting the tuple of the subsequent kernel includes predicting at least one of a third source location of the subsequent kernel, a third name of the subsequent kernel, a third property of a third argument of the subsequent kernel, or a second time of submission of the subsequent kernel.

* * * * *